US008867425B2

(12) United States Patent
Korus et al.

(10) Patent No.: US 8,867,425 B2
(45) Date of Patent: Oct. 21, 2014

(54) METHOD AND APPARATUS MULTIMEDIA BROADCAST/MULTICAST SERVICE COVERAGE BOOST

(71) Applicant: Motorola Solutions, Inc., Schaumburg, IL (US)

(72) Inventors: Michael F. Korus, Eden Prairie, MN (US); Peter M. Drozt, Prairie Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 89 days.

(21) Appl. No.: 13/724,098

(22) Filed: Dec. 21, 2012

(65) Prior Publication Data

US 2014/0177437 A1    Jun. 26, 2014

(51) Int. Cl.
*H04H 20/71* (2008.01)
*H04J 3/00* (2006.01)
*H04J 1/00* (2006.01)
*H04W 4/00* (2009.01)
*H04W 4/06* (2009.01)
*H04W 72/00* (2009.01)
*H04L 12/18* (2006.01)

(52) U.S. Cl.
CPC ............... *H04W 4/06* (2013.01); *H04L 12/189* (2013.01); *H04W 72/005* (2013.01)
USPC ........... 370/312; 370/280; 370/281; 370/328; 370/535

(58) Field of Classification Search
USPC .............. 370/280, 281, 310.2, 312, 314, 328, 370/330, 390, 535
See application file for complete search history.

(56) References Cited

U.S. PATENT DOCUMENTS

| 6,775,242 B2 | 8/2004 | Grilli et al. |
| 7,096,013 B1 | 8/2006 | Trandai et al. |
| 7,738,423 B2 | 6/2010 | Khan |

(Continued)

FOREIGN PATENT DOCUMENTS

| CN | 101325791 A | 12/2008 |
| EP | 1581014 A1 | 9/2005 |

(Continued)

OTHER PUBLICATIONS

Final Office Action mailed Apr. 25, 2013 in related U.S. Appl. No. 12/981,323, Michael F. Korus, filed Dec. 29, 2010.

(Continued)

*Primary Examiner* — Benjamin H Elliott, IV
(74) *Attorney, Agent, or Firm* — Steven A. May

(57) ABSTRACT

A method of assigning Multimedia Broadcast Multicast Service (E-MBMS) bearers in a Multimedia Broadcast Single Frequency Network (MBSFN) area in a 3GPP compliant wireless communication system is provided. An infrastructure device is operably coupled to a radio access network comprising one or more MBSFN areas, wherein each MBSFN area supports a plurality of E-MBMS bearers for transporting media streams to user equipments (UE). The infrastructure device receives, from a UE, an identifier of a preferred MBSFN area and a request for a boost to the quality of the transmissions. The infrastructure device assigns first and second E-MBMS bearers in an MBSFN area to support a call to the UE, the first and second E-MBMS bearers providing the same information to the UE in their media content streams. The UE may employ application layer time-diversity reception of the media content.

20 Claims, 12 Drawing Sheets

(56) References Cited

U.S. PATENT DOCUMENTS

| | | | |
|---|---|---|---|
| 7,768,914 | B2 | 8/2010 | Pauwels |
| 7,924,723 | B2 | 4/2011 | Johnson et al. |
| 7,995,510 | B2 | 8/2011 | Gao |
| 8,085,783 | B2 | 12/2011 | Zhou et al. |
| 8,098,590 | B2 | 1/2012 | Catovic et al. |
| 8,135,418 | B2 | 3/2012 | Ranganathan et al. |
| 8,175,069 | B2 | 5/2012 | Wang et al. |
| 8,576,763 | B2 | 11/2013 | Gonsa et al. |
| 2003/0148779 | A1 | 8/2003 | Aravamudan et al. |
| 2003/0211859 | A1 | 11/2003 | Chen et al. |
| 2005/0227718 | A1 | 10/2005 | Harris et al. |
| 2005/0235289 | A1 | 10/2005 | Barillari et al. |
| 2005/0260997 | A1 | 11/2005 | Korale et al. |
| 2006/0034202 | A1 | 2/2006 | Kuure et al. |
| 2007/0133527 | A1 | 6/2007 | Kuure et al. |
| 2007/0153727 | A1 | 7/2007 | McBeath et al. |
| 2007/0264992 | A1 | 11/2007 | Maenpaa |
| 2007/0281722 | A1 | 12/2007 | Gao |
| 2008/0102811 | A1 | 5/2008 | Amirjoo et al. |
| 2008/0212583 | A1 | 9/2008 | Rey et al. |
| 2008/0267109 | A1 | 10/2008 | Wang et al. |
| 2008/0293428 | A1 | 11/2008 | Rey et al. |
| 2008/0311892 | A1 | 12/2008 | Lee et al. |
| 2009/0080363 | A1 | 3/2009 | Song et al. |
| 2009/0080451 | A1 | 3/2009 | Gogic |
| 2009/0103466 | A1 | 4/2009 | Gu et al. |
| 2009/0113487 | A1 | 4/2009 | Nanjunda Swamy |
| 2009/0207773 | A1 | 8/2009 | Feng et al. |
| 2009/0245155 | A1 | 10/2009 | Fukunaga et al. |
| 2009/0303909 | A1 | 12/2009 | Farhoudi et al. |
| 2009/0323638 | A1 | 12/2009 | Catovic et al. |
| 2010/0027541 | A1 | 2/2010 | Eriksson et al. |
| 2010/0061308 | A1 | 3/2010 | Becker et al. |
| 2010/0081451 | A1 | 4/2010 | Mueck et al. |
| 2010/0128649 | A1 | 5/2010 | Gonsa et al. |
| 2010/0128722 | A1 | 5/2010 | Madour et al. |
| 2010/0157969 | A1 | 6/2010 | Swamy et al. |
| 2010/0222055 | A1 | 9/2010 | Cho et al. |
| 2010/0232340 | A1 | 9/2010 | Godor et al. |
| 2010/0265867 | A1 | 10/2010 | Becker et al. |
| 2010/0302988 | A1 | 12/2010 | Becker |
| 2010/0332610 | A1 | 12/2010 | Cherian et al. |
| 2011/0077006 | A1 | 3/2011 | Hsu |
| 2011/0128903 | A1* | 6/2011 | Futaki et al. ............... 370/312 |
| 2011/0145846 | A1 | 6/2011 | Kim |
| 2011/0149879 | A1 | 6/2011 | Noriega et al. |
| 2011/0151885 | A1 | 6/2011 | Buyukkoc et al. |
| 2011/0159880 | A1 | 6/2011 | Kumar et al. |
| 2011/0305183 | A1 | 12/2011 | Hsu et al. |
| 2011/0305184 | A1* | 12/2011 | Hsu ............................ 370/312 |
| 2012/0008525 | A1 | 1/2012 | Koskinen |
| 2012/0014264 | A1 | 1/2012 | Wang |
| 2012/0033623 | A1 | 2/2012 | Chu et al. |
| 2012/0044907 | A1 | 2/2012 | Mildh |
| 2012/0170501 | A1 | 7/2012 | Drozt et al. |
| 2012/0170502 | A1 | 7/2012 | Korus et al. |
| 2012/0172028 | A1 | 7/2012 | Korus et al. |
| 2012/0230240 | A1 | 9/2012 | Nebat et al. |
| 2012/0236776 | A1 | 9/2012 | Zhang et al. |
| 2013/0064160 | A1 | 3/2013 | Newberg et al. |
| 2013/0301509 | A1* | 11/2013 | Purnadi et al. ............ 370/312 |
| 2014/0177436 | A1 | 6/2014 | Korus et al. |

FOREIGN PATENT DOCUMENTS

| | | | |
|---|---|---|---|
| WO | 02089501 | A1 | 11/2002 |
| WO | 03098871 | A1 | 11/2003 |
| WO | 2006027006 | A1 | 3/2006 |
| WO | 2008123824 | A2 | 10/2008 |
| WO | 2011000947 | A1 | 1/2011 |
| WO | 2011068421 | A1 | 6/2011 |
| WO | 20110000947 | A1 | 6/2011 |

OTHER PUBLICATIONS

Final Office Action mailed Apr. 15, 2013 in related U.S. Appl. No. 12/981,226, filed Dec. 29, 2010.

Open Mobile Alliance Standard "OMA-TS-PoC_MULTICAST_PoC-V2.1-20091222-C"; Dec. 22, 2009; Sections 6 and 7; p. 23-27.

3GPP TS 26.346 V.9.4.0; "3rd Generation Partnership Project; Technical Specification Group Services and System Aspects; Multimedia Broadcast/Multicast Service (MBMS); Protocols and Codecs, Release 9"; Sections 5.4.1 and 8; Sep. 2010.

3GPP TS 23.246 V.9.5.0; 3rd Generation Partnership Project; Technical Specification Group Services and System Aspects; Multimedia Broadcast/Multicast Service (MBMS); Architecture and Functional Description, Release 9; Sections 4.4.3, 4.4.4, and 8; Jun. 2010.

3GPP TSG RAN WG3 #59bis; "E-MBS Functions of Statistical Multiplexing"; R2-074339; Oct. 8-12, 2007; Shanghai, China; 8 pages.

International Search Report and Written Opinion for related counterpart International Patent Application No. PCT/US2011/067354 mailed on Mar. 21, 2012.

International Search Report and Written Opinion for related counterpart International Patent Application No. PCT/US2011/066709 mailed on Jul. 6, 2012.

International Search Report and Written Opinion for related counterpart International Patent Application No. PCT/US2012/053051 mailed on Nov. 26, 2012.

Non Final Office Action mailed Oct. 26, 2012 in related U.S. Appl. No. 12/981,226, filed Dec. 29, 2010.

Non Final Office Action mailed Oct. 26, 2012 in related U.S. Appl. No. 12/981,323, Michael F. Korus, filed Dec. 29, 2010.

Non Final Office Action mailed Nov. 8, 2012 in related U.S. Appl. No. 12/981,274, Michael F. Korus, filed Dec. 29, 2010.

International Search Report and Written Opinion for counterpart International Patent Application No. PCT/US2011/066705 mailed on Jan. 18, 2013.

3rd Generation Partnership Project (3GPP), "3GPP TS 26.246 V9.0.0: Technical Specification Group Services and System Aspects; Transparent end-to-end packet switched streaming service (PSS); 3GPP SMIL Language Profile (Release 9)," 3GPP Standard, pp. 1-17, Dec. 10, 2009.

Open Mobile Alliance: "Poc User Plane Approved Version 1.0.3," OMA-TS-PoC_UserPlane-V1_0_3-20090922-A, pp. 1-12, Sep. 22, 2009.

Open Mobile Alliance: "OMA PoC Control Plane Approved Version 1.0.3," OMA-TS-PoC_ControlPlane-V1_0_3-20090922-A, pp. 1-8, Sep. 22, 2009.

Rosenberg, J. et al., "SIP: Session Initiation Protocol," RFC 3261, Network Working Group Request for Comments, pp. 14, Jun. 1, 2002.

Non Final Rejection mailed Mar. 3, 2013 in related U.S. Appl. No. 12/981,374, Michael F. Korus, filed Dec. 29, 2010.

"Multimedia Broadcast and Multicast Services in 3G Mobile Netowrks," Alcatel Telecommunications Revenues, pp. 1-12, Apr. 1, 2004.

Alexiou, A. et al., "MBMS Multicast Mode of UMS," Retrieved from the Internet URL: http://ru6.cti.gr/ru6/publications/2148HCNDS2007_MBMS_Bouras.pdf on Jul. 21, 2014, pp. 1-33.

Ericsson et al., "MBMS Interest Indication for connected UEs", 3GPP Draft, R2-116190, 3rd Generation Partnership Project (3GPP), Mobile Competence Centre, vol. RAN WG2, No. San Francisco, USA, pp. 20111110-20111114, Nov. 8, 2011.

Hallahan, R. and Peha, J.M., "Policies for Public Safety Use of Commercial Wireless Networks," 38th Telecommunications Policy Reasearch Conference, Retrieved from the Internet URL: http://users.ece.cmu.edu/~peha/public_safety_priority_access.pdf on Jul. 21, 2014, pp. 1-34.

Hartung, F. et al., "MBMS-IP Multicast/Broadcast in 3G Networks," International Journal of Digital Multimedia Broadcasting, vol. 2009, (2009) Article ID 597848, pp. 1-25.

Huawei, "Stage 2 agreements on service continuity and location information for MBMS for LTE," 3GPP Draft, R2-115596, 3rd Generation Partnership Project (3GPP), Mobile Competence Centre, vol. RAN WG2, No. Zhuhai; 20111010, Oct. 26, 2011.

(56) References Cited

OTHER PUBLICATIONS

International Search Report for counterpart International Patent Application No. PCT/US2013/071828 mailed on May 13, 2014.
International Search Report for counterpart International Patent Application No. PCT/US2013/071837 mailed on May 13, 2014.
Non-Final Office Action mailed Mar. 1, 2013 in U.S. Appl. No. 12/981,274, Michael F. Korus et al., filed Dec. 29, 2010.
Non-Final Office Action mailed Apr. 17, 2014 in U.S. Appl. No. 13/231,530, Donald G. Newberg et al., filed Sep. 13, 2011.
Non-Final Office Action mailed Jun. 4, 2014 in U.S. Appl. No. 12/981,323, Michael F. Korus et al., filed Dec. 29, 2010.
Qualcomm Europe, "Qualcomm proposal for E-UTRAN Architecture and Protocols," 3GPP Draft, R2-052921, 3rd Generation Partnership Project (3GPP), Mobile Competence Centre, vol. RAN WG2, No. Seoul, Korea; 20051102, Nov. 2, 2005.

* cited by examiner

| UE LOCATION | SITUATION/ STATUS OF UE | MBSFN AREA ID(S) THAT UE REPORTS | PREFERENCES THAT UE REPORTS | ATTRIBUTES THAT UE REPORTS |
|---|---|---|---|---|
| 210 | STATIONARY | MBSFN AREA 230 | NONE. MBSFN AREA 230 IS BY DEFAULT THE PRIMARY PREFERRED MBSFN AREA | NONE |
| 214 | STATIONARY, AT AN INCIDENT SCENE | MBSFN AREAS 230 AND 240 | MBSFN AREA 230 IS THE PRIMARY PREFERRED MBSFN AREA. MBSFN AREA 240 IS THE SECONDARY PREFERRED MBSFN AREA. | COVERAGE BOOST REQUEST |
| 216 | MOVING | MBSFN AREAS 230, 240 AND 250 | MBSFN AREA 230 IS THE PRIMARY PREFERRED MBSFN AREA. MBSFN AREA 240 IS THE SECONDARY PREFERRED MBSFN AREA. MBSFN AREA 250 IS THE TERNARY PREFERRED MBSFN AREA. | MAKE BEFORE BREAK SERVICE REQUEST, TO SUPPORT MOBILITY OF UE |
| 218 | MOVING | MBSFN AREA 240 | NONE. MBSFN AREA 240 HAS SUFFICIENT SIGNAL STRENGTH THAT THE UE ONLY REPORTS ONE MBSFN AREA ID. | NONE |
| 220 | STATIONARY | MBSFN AREA 240 | MBSFN AREA 240 IS REPORTED AS THE PRIMARY PREFERRED MBSFN AREA, NO OTHERS ARE REPORTED | COVERAGE BOOST REQUEST |

FIG. 3

|  | MBSFN AREA 1 | MBSFN AREA 2 | MBSFN AREA 3 | MBSFN AREA 4 | COVERAGE BOOST REQUEST? |
|---|---|---|---|---|---|
| UE A |  | SECONDARY |  | PRIMARY | NO |
| UE B | PRIMARY |  | SECONDARY |  | NO |
| UE C | PRIMARY | SECONDARY |  |  | NO |
| UE D | SECONDARY |  | PRIMARY |  | YES |
| UE E |  |  |  | PRIMARY | YES |
| CURRENT MBSFN CAPACITY: | AVAILABLE | AVAILABLE | FULL | AVAILABLE |  |
| HOW MANY E-MBMS BEARERS ASSIGNED IN MBSFN AREA: | 2 | 1 | 0 | 2 |  |

Row labels: GROUP MEMBERS (UE A – UE E)

*FIG. 5*

|  | MBSFN AREA 1 | MBSFN AREA 2 | MBSFN AREA 3 | MBSFN AREA 4 | COVERAGE BOOST REQUEST? |
|---|---|---|---|---|---|
| GROUP MEMBERS UE A | | SECONDARY | | PRIMARY | NO |
| UE B | PRIMARY | | SECONDARY | | NO |
| UE C | PRIMARY | SECONDARY | | | NO |
| UE D | SECONDARY | | PRIMARY | | YES |
| UE E | | | | PRIMARY | YES |
| CURRENT MBSFN CAPACITY: | AVAILABLE | AVAILABLE | AVAILABLE | AVAILABLE | |
| HOW MANY E-MBMS BEARERS ASSIGNED IN MBSFN AREA: | 1 | 1 | 2 | 2 | |

*FIG. 6*

METHOD AND APPARATUS MULTIMEDIA BROADCAST/MULTICAST SERVICE COVERAGE BOOST

RELATED APPLICATIONS

The present application is related to the following U.S. applications commonly owned with this application by Motorola Solutions, Inc.: U.S. patent Application Publication No. 2012/0172028, Publication Date, Jul. 5, 2012, titled "METHODS FOR ASSIGNING A PLETHORA OF GROUP COMMUNICATIONS AMONG A LIMITED NUMBER OF PRE-ESTABLISHED MBMS BEARERS IN A COMMUNICATION SYSTEM" by Korus, et al.; U.S. Application Publication No. 2012/0170501, Publication Date, Jul. 5, 2012, titled "METHODS FOR TRANPORTING A PLURALITY OF MEDIA STREAMS OVER A SHARED MBMS BEARER IN A 3GPP COMPLIANT COMMUNICATION SYSTEM"; by Drort, et al.; and U.S. application Ser. No. 13/724,039, filed on the same date as the present application, titled "METHOD AND APPARATUS FOR MULTIMEDIA BROADCAST MULTICAST SERVICE", by Korus, et al. the entire contents of each being incorporated herein by reference.

FIELD OF THE DISCLOSURE

The present disclosure relates generally to Multimedia Broadcast Multicast Services (MBMS), and more particularly to a method and apparatus for improving the reception of a Multimedia Broadcast Multicast Service by mobile communication units.

BACKGROUND

Long Term Evolution (LTE) is a radio technology designed to increase the capacity and speed of mobile communication networks. LTE provides for an end-to-end Internet Protocol (IP) service delivery of media. Currently, LTE comprises a set of enhancements to the Universal Mobile Telecommunications System (UMTS), which is described in a suite of Technical Specifications (TS) developed within and publicized by the 3rd Generation Partnership Project (3GPP).

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplex) and TDD (time-division duplex) in the same platform, improved end user experience, simple architecture resulting in low operating costs, and interoperability with older standard wireless technologies such as GSM (Global Systems for Mobile Communications), cdmaOne™, W-CDMA (UMTS), and CDMA2000®. Many major carriers in the United States (US) and several worldwide carriers have started to convert their networks to LTE.

LTE and other 3GPP compliant systems (meaning systems having elements that operate in compliance with 3GPP TSs) also provide Multimedia Broadcast Multicast Service (MBMS) point-to-multipoint transport of media to user equipment (UE) operating on the system. MBMS operation allows a defined set of LTE cells to "simulcast" bit for bit identical information in a Multicast Broadcast Single Frequency Network (MBSFN). This simulcast of information provides constructive RF interferences over a wide area, improving both coverage and performance when many endpoints desire to receive the same content. A UE can receive MBMS content either in connected mode or idle mode.

Starting in 3GPP release 8, E-MBMS is now referred to as E-MBMS (Evolved MBMS) to distinguish it from previous 3GPP architectures. Similarly, there are changes to the name of the Radio Access Network (RAN), i.e. the UTRAN becomes the E-UTRAN, and the core, i.e. this becomes the Evolved Packet Core (EPC). A multi-cell E-MBMS transmission provides a transmission of bit for bit identical information at exactly the same time and frequency, and is also referred to as an MBSFN transmission (Multicast Broadcast Single Frequency Network transmission). An alternative, generic industry term for such a simulcast transmission is an 'SFN transmission', but the term MBSFN transmission will be used henceforth. Cells are configured to belong to a MBSFN Area. All cells that belong to a defined MBSFN area, and which participate in a MBSFN transmission, will transmit E-MBMS media (media content) at exactly the same time and frequency. As a consequence, all cells simulcast bit for bit identical information at exactly the same time and frequency.

Unfortunately, the E-MBMS transport mechanisms that are described in the 3GPP TSs have many shortcomings when applied to mission critical group communications. However, if organizations having more stringent requirements for media transport are going to use 3GPP E-MBMS technology, it is desirable for these systems to provide enhanced coverage and performance.

In 3GPP compliant systems, handover applies to connected mode only UEs, in which the cell mobility event is controlled by the network. On the other hand, cell reselection applies to idle mode UEs, and is performed entirely by the UE. With cell reselection by an idle mode UE, the network is neither involved nor aware.

Accordingly, there is a need for enhancements to Multimedia Broadcast Multicast Services.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a table illustrating values that may be reported by UEs.

FIG. 5 is a table illustrating one example of a call group.

FIG. 6 is a table illustrating another example of a call group.

Figure 1:
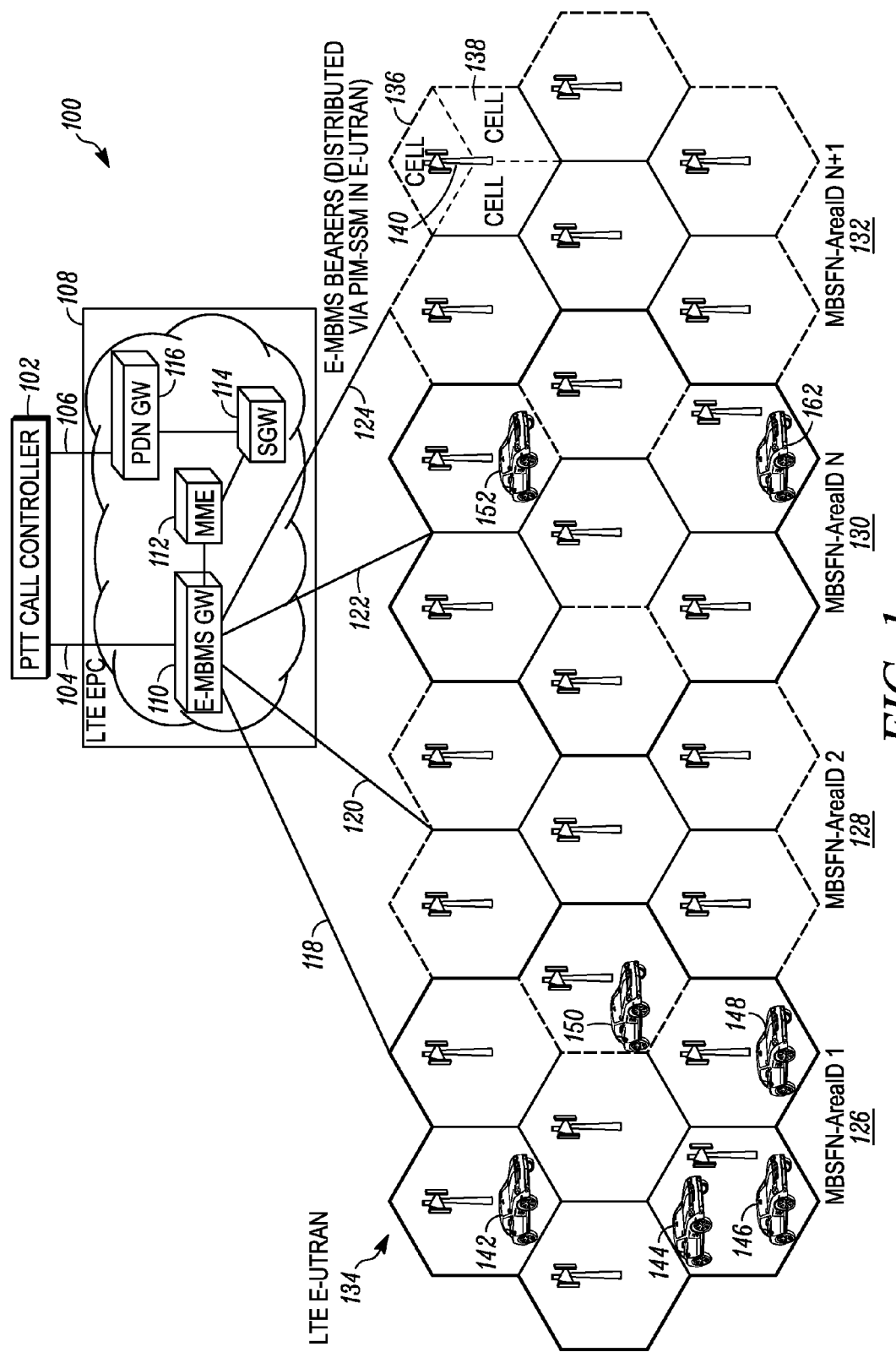
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of assigning Multimedia Broadcast Multicast Service (E-MBMS) bearers in a Multimedia Broadcast Single Frequency Network (MBSFN) area in a Third Generation Partnership Project (3GPP) compliant wireless communication system. An infrastructure device is operably coupled to the 3GPP compliant system, the 3GPP compliant system having a radio access network comprising one or more MBSFN areas, wherein each MBSFN area supports a plurality of E-MBMS bearers for transporting media streams to user equipments (UE). The infrastructure device uses application layer processing to perform receiving of information from a UE, the information comprising an identifier that identifies at least a primary preferred MBSFN area for providing transmissions to the UE, and a request for a boost to the quality of the transmissions received by the UE. A first E-MBMS bearer and a second E-MBMS bearer are used in an MBSFN area, to support a call to the UE. The first E-MBMS bearer provides a first media content stream to the UE. The second E-MBMS bearer provides a second media content stream to the UE. The first media content stream and the second media content stream comprise the same information.

The first E-MBMS bearer and the second E-MBMS bearer may be assigned in the primary preferred MBSFN area. However, the first E-MBMS bearer and the second E-MBMS bearer may be assigned in an MBSFN area that the UE identified as a secondary preferred or a ternary preferred MBSFN Area. When a first E-MBMS bearer and a second E-MBMS bearer are assigned in one MBSFN area to support the same call to a UE, different subframe resources are used to make this possible. The first E-MBMS bearer and the second E-MBMS bearer may be offset in time. This timing offset allows the UE to receive the first E-MBMS bearer and the second E-MBMS bearer simultaneously. The first E-MBMS bearer and the second E-MBMS bearer may also be offset in frequency.

The UE may transmit request for a boost to the quality of the transmissions some time after it transmits the identifier of the primary preferred MBSFN area. If the UE transmits the request for a boost some time after it transmits the identifiers, then the infrastructure device may assign the second E-MBMS bearer some time after it assigns the first E-MBMS bearer. Reference to a boost to 'coverage' may include any improvement in reception by a UE, including received signal strength or quality.

FIG. 1 is a communication system in accordance with some embodiments, shown and indicated generally at 100. System 100 includes system elements of: an infrastructure device 102 such as an application server (that is illustrated as a Push-to-Talk (PTT) Controller); and an LTE Evolved Packet Core (EPC) 108 (having a Mobility Management Entity (MME) 112, a E-MBMS Gateway (E-MBMS GW) 110, a Serving Gateway (SGW) 114, and a Packet Data Network Gateway (PDN GW) 116. Other elements of an LTE EPC are not included for ease of illustration. An example would be a Broadcast Multicast Service Center (BM-SC), which could be located within the EPC or alternatively within the application server.

System 100 further includes elements of: an access network (in this case an LTE Evolved Universal Terrestrial Radio Access Network (E-UTRAN)) 134 that includes a plurality of eNodeBs (LTE base station) infrastructure devices (with one labeled as 140); and a plurality of UE 142, 144, 146, 148, 150, 152, 162. In general, the EPC and the E-UTRAN are referred to collectively as the LTE system.

The E-UTRAN 134 elements, EPC 108 elements, PTT call controller 102, and UEs 142 to 162 implement protocols and signaling in compliance with 3GPP TSs. The terms LTE communication system, LTE system, and Evolved Packet System (EPS) are used interchangeably herein, and are each defined as being inclusive of the E-UTRAN 134 and the EPC 108 but not inclusive of the PTT call controller 102 or the UE. Moreover, only a limited number of EPC elements and UEs, and one PTT call controller and E-UTRAN are shown in the diagram. More such elements may be included in an actual system implementation. Also, the E-UTRAN can be any type of access network, including any 3G, e.g., UMTS, or 4G e.g. WiMAX, access network, or WiFi.

In general, the UE, the PTT call controller 102, the EPC 108 logical elements, and the E-UTRAN 134 elements are each implemented using (although not shown) a memory, one or more network interfaces, and a processing device that are operatively coupled, and which when programmed form the means for these system elements to implement their desired functionality, for example as illustrated by reference to the methods and diagrams shown in FIGS. 2-12. The network interfaces are used for passing signaling, also referred to herein as messaging between the elements of the system 100. The signalling may include e.g., messages, packets, datagrams, frames, superframes, and the like. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the UE, the PTT call controller 102, the EPC 108 logical elements, and the E-UTRAN 134 elements may be programmed with software or firmware logic or code for performing functionality described by reference to FIGS. 2 to 12. In addition or alternatively, the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

The UE 142, 144, 146, 148, 150, 152, 162, are also referred to in the art as subscribers, communication devices, access devices, access terminals, mobile stations, mobile subscriber units, mobile devices, user devices, and the like. Although illustratively shown in FIG. 1 as a device used in a vehicle, the UE can be any type of communication device such as radios, mobile phones, mobile data terminals, Personal Digital Assistants (PDAs), laptops, two-way radios, cell phones, and any other device capable of operating in a wired or wireless environment and that can be used by a user in the system.

Infrastructure device 102 is an intermediary device that facilitates transport of media (e.g., voice, data, video, etc.) from one or more source applications to one or more destination devices (such as members affiliated with a communication group, such as a talkgroup) over the LTE system. As such, the application server may be, for instance, a computer aided dispatch (CAD) server, a media server, a call controller, etc. In one illustrative embodiment, infrastructure device 102 is an application server in a packet data network providing application layer services to UEs connected to the E-UTRAN 134 that are authorized and have the capabilities to use these services. In this instance, infrastructure device 102 is a PTT call controller providing PTT services to the UE. Other services may include, for example, PTV (Push-to-Video) services, PTX (Push-to-anything) services, etc.

In general in a communications system such as that shown in FIG. 1, two MBSFN areas can be independent, i.e. they would not have any common cells between them. However, two adjacent MBSFN areas can overlap, in which case they would have one or more common cells. With overlapping MBSFN areas, at least one cell is able to transmit one or more e-MBMS bearers assigned to one of the MBSFN areas, but can also transmit one or more e-MBMS bearers assigned to the other MBSFN area.

Figure 2:
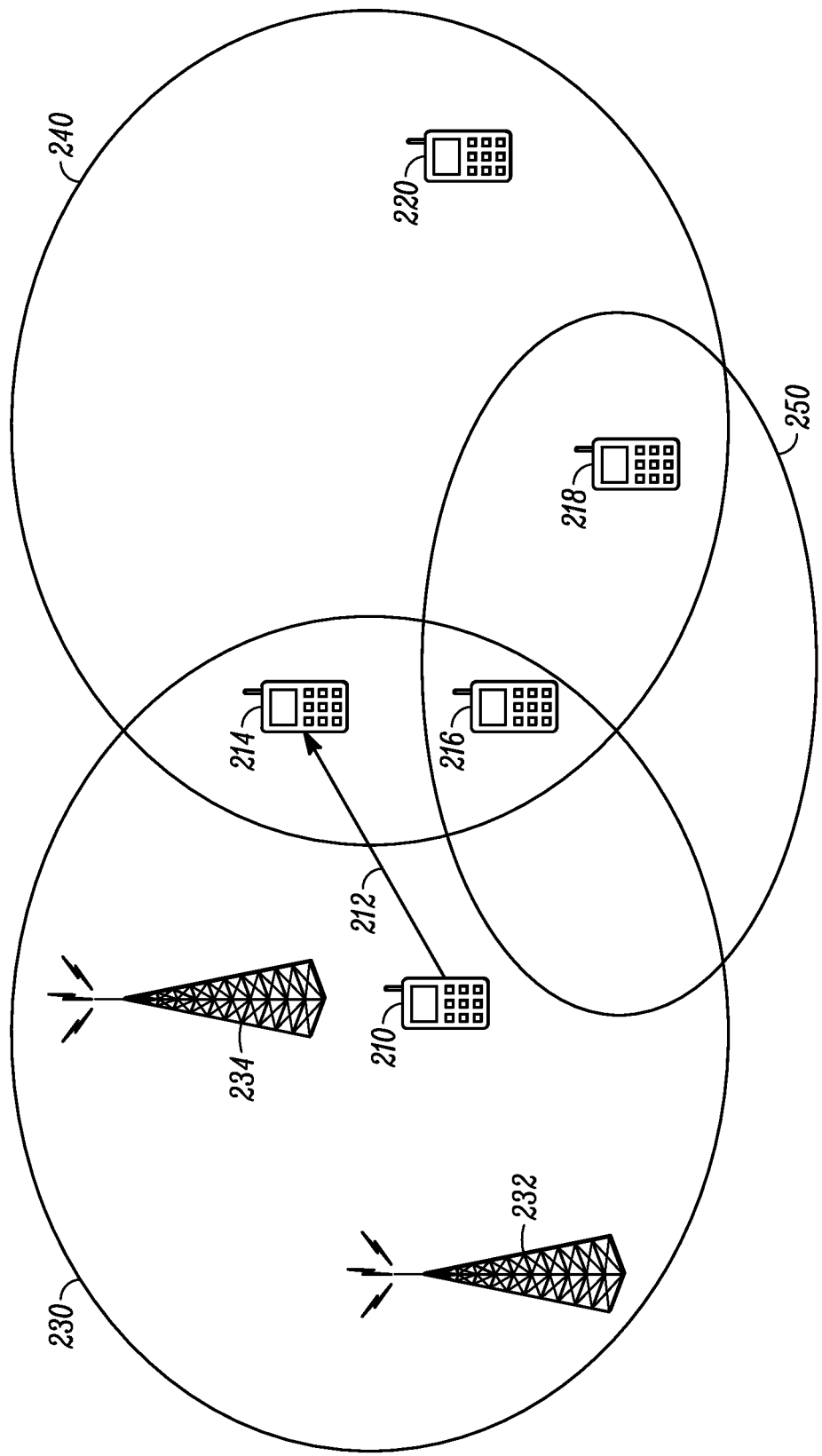
FIG. 2 is a schematic view of three MBSFN areas.

FIG. 2 is a schematic view of three MBSFN areas of a communications system. A UE is shown as UE 210, 214, 216, 218 and 220, each illustration of the UE corresponding to a successively later location of the UE. Arrow 212 illustrates motion between the locations shown as UE 210 and UE 212. Generally the UE is a 3GPP device, such as an LTE device. The UE may however be any of the examples of a UE explained with reference to FIG. 1, and may even be a half-duplex two-way radio mounted in a vehicle.

Three MBSFN areas are shown respectively as MBSFN area 230, MBSFN area 240 and MBSFN area 250. Each MBSFN area includes multiple cells, which are not shown on FIG. 2 but can be understood from FIG. 1. Base stations 232 and 234 are shown within MBSFN area 230, and generally indicate the locations of two cells. There would normally be many more base stations in each of MBSFN area 230, MBSFN area 240 and MBSFN area 250. Each of MBSFN area 230, MBSFN area 240 and MBSFN area 250 has an overlap with the other two areas. This leads to the situation shown at the location UE 214, where all three of MBSFN area 230, MBSFN area 240 and MBSFN area 250 overlap. An 'overlap' may simply be an overlap in coverage. In this case, a UE at location UE 214, UE 216 or UE 218 may receive different E-MBMS bearers directly from two or more different cells, each cell being in a different one of MBSFN area 230, MBSFN area 240 and MBSFN area 250. However, the overlap may include an overlap at a cell level. In this case, UE 214, UE 216 or UE 218 may receive different E-MBMS bearers from one cell, with that one cell forming part of two or more of MBSFN area 230, MBSFN area 240 and MBSFN area 250a.

Within any one MBSFN area shown in FIG. 2, the cells may deliver an MBSFN transmission. An MBSFN transmission provides simultaneous bit-for-bit identical signals in time and frequency in each cell of the MBSFN area. If a call group, of which the UE is part, is spread throughout more than two MBSFN areas, the media content of the call provided as an MBSFN transmission in one of those MBSFN areas will normally, in known systems, not be synchronous with the MBSFN transmission in another of the MBSFN areas in which members of the group are located.

Whilst in each MBSFN area, the UE will receive a corresponding MBSFN area identifier (MBSFN area ID), as explained with reference to FIG. 1. At each location of the UE shown in FIG. 2, the UE can report the corresponding identifier of the MBSFN area to an infrastructure device. The UE may report the MBSFN-Area ID parameter that is broadcast by the MBSFN area in the Session Information Block 13 (SIB-13) data block. However, the UE may instead report the identifier of the MBSFN area in another form. The infrastructure device may be a PTT server, which may for example form part of PTT call controller 102 of FIG. 1.

At the location shown by UE 210, the UE will receive and report only the MBSFN area ID of MBSFN area 230. At the locations illustrated by UE 214, 216 and 218, the UE will receive more than one MBSFN area ID, and may report all or some of those MBSFN area IDs to the infrastructure device. At the location shown by UE 220, the UE will receive and report only the MBSFN area ID of MBSFN area 240.

When the UE can receive from two MBSFN areas satisfactorily at one location, it may report one MBSFN area ID as being its primary preferred MBSFN area, and another MBSFN area ID as being its secondary preferred MBSFN area. When the UE can receive from three or more MBSFN areas at one location, it may also report one MBSFN area ID as being its ternary preferred MBSFN area ID, or multiple MBSFN area IDs as secondary preferred MBSFN area IDs.

The UE will also report a request for a boost to coverage, when the UE considers this necessary. One condition under which the UE may consider this necessary is when it is receiving poor signal coverage from all the MBSFN areas from which it can receive a signal. So, for example, the UE may request a boost for coverage when the UE is at the periphery of an MBSFN area, or physical constraints around the location of the UE prevent strong signal reception. Another condition, under which the UE may report a request for a boost to coverage, is when it requests an emergency call. In addition to requesting a boost to coverage from one MBSFN area, the UE may also report that the UE requires a Make Before Break (MBB) service. The UE may, for example, request this when it expects to move to another MBSFN area, or is already moving.

The communications system of FIG. 2 may improve service reception by transmitting a first E-MBMS bearer and a second E-MBMS bearer in one MBSFN area, to support a call to the UE. The first E-MBMS bearer and the second E-MBMS bearers will be transmitted in the MBSFN area with different Temporary Mobile Group Identifiers (TMGI). The first E-MBMS bearer provides a first media content stream to the UE, and the second E-MBMS bearer provides a second media content stream to the UE, the first media content stream and the second media content stream comprising the same information. When the first media content stream on the first E-MBMS bearer and the second media content stream on the second E-MBMS bearer are transmitted with a time offset, the UE can employ application layer time-diversity reception to recover the information. There may also be a frequency offset between the transmission frequency of the first media content stream on the first E-MBMS bearer and the transmission frequency of the second media content stream on the second E-MBMS bearer.

Enhancements at the application layer may thus be used to enable E-MBMS service boost, particularly near to the peripheries of an MBSFN area, either for idle or connected UEs. These enhancements provide opportunities for improved E-MBMS edge performance (i.e. media reception). For example, with communication services such as PTT, the UE may be permitted to continue receiving the same PTT audio to an acceptable standard, when the UE is at a location where one E-MBMS bearer could not alone provide sufficient signal quality.

Returning to FIG. 2, each of MBSFN area 230, MBSFN area 240 and MBSFN area 250 may also be constrained to transmit on a subset of subframes that differs from those used by the other two MBSFN areas. Such a constraint is illustrated later by FIG. 12. The subset of subframes may also differ from those used in any other neighboring MBSFN areas not shown on FIG. 2.

The table of FIG. 3 illustrates values that may be reported by the UE in the three MBSFN areas of the communication system of FIG. 2. The left column of the table uses the locations of the UE that are shown as UE 210, 214, 216, 218 and 220 in FIG. 2. The second column provides an example of details of the situation/status of the UE. The third column indicates the MBSFN area IDs that the UE can report at each location. The fourth column provides an example of preferences that the UE may report. The fifth column provides examples of coverage boost requests or requests for 'Make before Break' service, which the UE includes in its report.

In FIG. 3, UE 210 receives only signals from MBSFN area 230, and this is its default primary preferred MBSFN Area. Likewise, UE 220 receives only MBSFN area 240, and this is its default primary preferred MBSFN Area.

UE 214 receives signals from both of MBSFN areas 230 and 240. UE 214 reports MBSFN area 230 as the primary preferred MBSFN area and MBSFN area 240 as the secondary preferred MBSFN area. UE 216 receives all of MBSFN areas 230, 240 and 250. UE 216 reports MBSFN area 230 as the primary preferred MBSFN area, MBSFN area 240 as the secondary preferred MBSFN area, and MBSFN area 250 as the ternary preferred MBSFN area. However, UE 218 receives MBSFN areas 240 and 250, but only reports MBSFN area 240. This is because MBSFN area 240 is received with sufficient signal strength that UE 218 only needs to report one MBSFN area ID.

As is clear for UE 218, a UE may only report a single MBSFN if the UE is within good/strong E-MBMS coverage. The received E-MBMS signal strength can be determined by the quality of received E-MBMS channel, in terms of successful packet reception. Alternatively, the UE may report all MBSFN areas that meet a minimum threshold and identify the primary/preferred MBSFN area. This primary/preferred selection may be based upon E-MBMS signal strength, whether the UE is in idle or connected mode, current MBSFN area, preferred MBSFN area (for the UE or per group), whether the UE is mobile or stationary, or the location of the UE within the MBSFN area (middle or edge).

Once the UE has determined which MBSFN Area IDs to report as primary preferred, secondary preferred and possibly ternary preferred, then the UE sends a message with the identifiers. The message may be a SIP PUBLISH message, and may provide an MBSFN-Area update. The UE may include a boost request ('Diversity Receive') as a parameter in the MBSFN-Area update. The UE may also include an MBB service request parameter. The reporting of visible MBSFN areas and an additional request for a boost can be done separately. For example, MBSFN area 230 may first be reported as the primary preferred MBSFN area, and MBSFN area 240 as secondary. Later, with a subsequent message, the UE may then transmit a request for a coverage boost.

Figure 4:
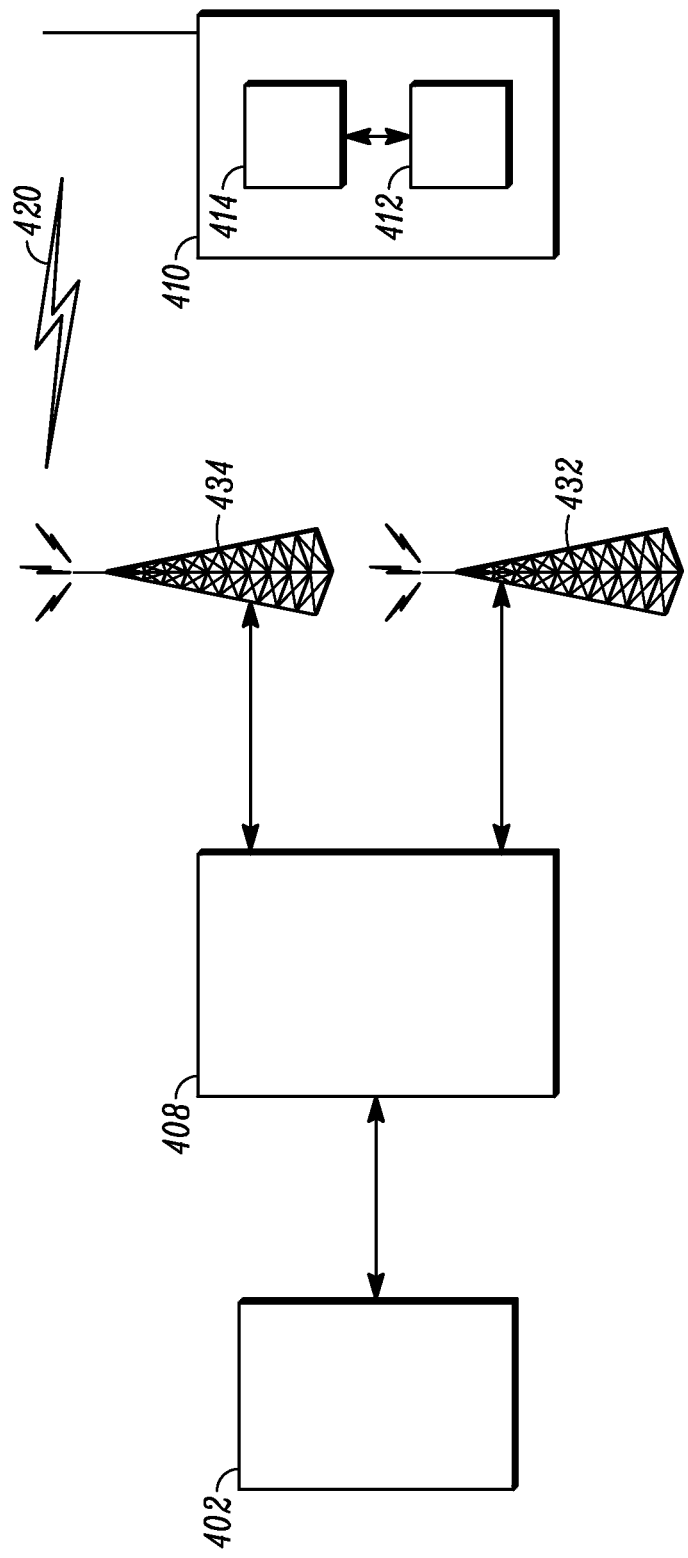
FIG. 4 is a block diagram illustrating elements of the infrastructure of the communication system and the UE.

FIG. 4 is a block diagram that illustrates the elements of the infrastructure of the communication system and the UE that may interact Infrastructure device 402 may correspond to call controller 102 of FIG. 1. Packet core 408 may correspond to LTE EPC packet core 108 of FIG. 1. UE 410 may correspond to the UE of FIG. 2. UE 410 comprises transmission/reception circuitry 414, which is under the control of controller 412. Controller 412 comprises application logic. Base stations 432 and 434 may correspond to base stations 232 and 234 of MBSFN Area 230 in FIG. 2.

Radio link 420 between UE 410 and, for example, base station 434 allows the exchange of information between UE 410 and base station 434, and hence between UE 410 and infrastructure device 402. Radio link 420 allows UE 410 to report such information as that shown in the third, fourth and fifth columns of the table of FIG. 3 to infrastructure device 402. Radio link 434 also allows one or more E-MBMS transmissions to UE 410 and other UEs of the call group of which UE 410 is part, within the MBSFN Area served by base stations 432 and 434. Radio link 420 is one link that must be traversed in order for a UE to communicate with the controller. However, an EPS Bearer is made up of a radio bearer and an EPC bearer, which together provide a communication path from a UE 410 to the packet core 408.

Application layer logic within UE 410 and infrastructure device 402 work together. As explained in more detail in connection with FIG. 5, data provided by UE 410 allows infrastructure device 402 to deliver the same information in different media content streams. Those media content streams may be delivered within multiple overlapping MBSFN areas simultaneously, and may be delivered on two or more E-MBMS bearers in one MBSFN Area. So a UE at location 220 on FIG. 2 can receive at least two media content streams comprising the same information in one MBSFN area, which is MBSFN area 240 in FIG. 2. At least a first media content stream is received on a first E-MBMS bearer and a second media content stream is received on a second E-MBMS bearer, but both media streams deliver the same call/content.

The arrangement of FIG. 4 also ensures that a UE such as UEs 214 or 216 in FIG. 2 can receive a group call from more than one overlapping MBSFN area. Here 'multiple overlapping MBSFN areas' need to be overlapping from a coverage perspective. However, the overlap does not necessarily need to include an overlap at a cell level, i.e. a cell which transmits E-MBMS bearers from two or more of the 'multiple overlapping MBSFN areas'.

The UE may use application layer time-diversity reception to process the received E-MBMS media content, when the UE receives the same E-MBMS media content via each of the at least two E-MBMS bearers, with a time offset between the E-MBMS transmissions on each of the first and second E-MBMS. The UE may use Real-time Transport Protocol (RTP) header information to construct a single media stream, from received E-MBMS media content. UE 410 can use this approach with either two or more E-MBMS bearers transmitted in one MBSFN Area, or with two or more E-MBMS bearers transmitted in different MBSFN Areas.

The application layer logic within infrastructure device 402 uses the primary preferred MBSFN area and secondary preferred MBSFN area reported by at least one UE of a group, when selecting in which MBSFN areas the content should be provided (using an E-MBMS bearer within in each of the selected MBSFN areas). Where a UE reports a request for a coverage boost, the infrastructure device 402 may also use this request when making the selection of which of the MBSFN areas should be included in the group call and the assignment of E-MBMS bearers in the selected MBSFN areas to carry the media content. Here, the 'media content' may be any or all of the voice, data, video, etc. content described in connection with element 102 of FIG. 1.

The application layer logic within infrastructure device 402 uses at least one E-MBMS bearer within each selected MBSFN area. However, when a boost request has been received, it may use more than one E-MBMS bearer in one MBSFN area, and may use more than one E-MBMS bearer in two or more MBSFN areas, in each case to deliver the same information over multiple media content streams. The E-MBMS bearers may be pre-established E-MBMS bearers, which are now assigned to the call. Alternatively, a new E-MBMS bearer may be created "on demand". A different TMGI will be used for each of two or more E-MBMS bearers transmitted in the same MBSFN Area. Where a new E-MBMS bearer is created, this may involve extending the E-MBMS user service from the other MBSFN areas.

Depending on the preferred MBSFN areas reported by each UE of a call group, a given UE may or may not be served by an E-MBMS bearer in each of its primary preferred MBSFN and secondary preferred MBSFN areas. Other constraints, such as system loading and the locations of other UEs in the call group, may also be used by the infrastructure device 402 when selecting which of the MBSFNs and how many E-MBMS bearers in one MBSFN Area should carry the content. FIG. 5 explains this in more detail. Additional E-MBMS bearers may be used in one MBSFN area for one call, whereas known communication systems would have served with the same call in the same MBSFN Area with a single E-MBMS bearer.

A UE may detect an MBSFN area from MBSFN Area IDs in Session Information Block 13 (SIB-13) signaling provided by the MBSFN. The preferred MBSFN areas need to be identified, and providing the MBSFN-Area IDs from SIB 13 is one way of achieving this. Alternatively, the detection may be via application layer signaling, if needed. The UE reports the detected MBSFN coverage areas to infrastructure device 402 via, for example, an application signaling message, along with preferences and boost and/or MBB requests added by the UE. Other reported parameters may take many forms, for example indicating that the device is 'stationary' or 'mobile'.

Considering again the interaction between the infrastructure device 402 and the application layer logic within UE 410, the infrastructure device 402 may receive one or more MBSFNs area identifiers from many UEs Infrastructure device 402 stores all received MBSFNs area identifiers. Within the communication system, policy rules may be set that determine whether a given UE is allowed to report multiple MBSFN-Area IDs. Different UEs may report MBSFNs area identifiers, preferences and attribute parameters at different times, so infrastructure device 402 may be arranged to hold a current list of received values of all those variables for each UE.

During call processing, infrastructure device 402 may follow a variety of additional steps, when determining which MBSFN areas to include in a call. That decision is based on the MBSFN area preference information (primary, secondary, ternary) supplied by UEs that are members of the group, and will also be based on any coverage boost requests. Other considerations may be current system loading and whether secondary/ternary MBSFNs are already in the call, and call state (emergency, major incident, priority). Infrastructure device 402 acts as a controller, allocating resources based on the above parameters Infrastructure device 402 may receive an indication of a priority level of a call from a UE. Infrastructure device 402 may then assign the first E-MBMS bearer and the second E-MBMS bearer, also partly on the basis of the priority level of the call. When the priority level of the call indicates that the call is an emergency call, infrastructure device 402 may always allocate a second E-MBMS bearer in the preferred MBSFN area. In addition, when the priority level of the call indicates that the call is an emergency call and there is sufficient capacity, infrastructure device 402 may also allocate a third E-MBMS bearer in the preferred MBSFN area.

Although a UE might be assigned E-MBMS bearers in each of its primary and secondary preferred MBSFN areas, this may not be the case. A UE might be assigned E-MBMS bearers in its primary and ternary preferred MBSFN areas only. Such an assignment might arise when the UE's ternary preferred MBSFN area has also been identified as a secondary preferred or ternary preferred MBSFN area by one or more other UEs that are group members. A UE might also be assigned E-MBMS bearers only in its primary and ternary preferred MBSFN areas, if the UE's secondary preferred MBSFN area does not have capacity, for example if the UE's secondary preferred MBSFN area has no available E-MBMS resources. Alternatively, a UE might only be assigned E-MBMS bearers in its primary and one of several secondary preferred MBSFN areas that it reported. In another possibility, the UE may not even be assigned the primary preferred MBSFN area that it reported. This might happen if the primary preferred MBSFN area did not have sufficient resources to support a new E-MBMS bearer. Instead, the UE may be assigned only its secondary preferred and ternary preferred MBSFN areas, or two of two or more secondary preferred MBSFN areas that it reported.

Thus far, resource allocation by infrastructure device 402 has been discussed in terms of E-MBMS bearers. However, the UE may be allocated a second Multicast Traffic Channel (MTCH) within one MBSFN, in order to provide boost coverage at the edge of the MBSFN area. Multiple MTCHs may also be allocated if the call is an emergency call.

After allocation of two or more E-MBMS bearers by infrastructure device 402 for distribution of media content to the call group consisting of at least UE 410 of FIG. 4, UE 410 will receive the same content from multiple MBSFNs, offset in time. Upon receiving the content, UE 410 will time align the multiple received content streams from the multiple E-MBMS bearers, for example by buffering the content. UE 410 will use header information to detect missing packets, and then combine packets from the multiple E-MBMS bearers to construct a single content stream.

UE 410 may report to infrastructure device 402 if/when a coverage boost is no longer needed. This might occur when the UE moves to a point where signal reception from the one MBSFN area is very good. One example of when this might occur would be when the UE moves from the location shown as UE 220 to the location shown by UE 218 in FIG. 2. UE 410 may make an additional report when an MBSFN area is no longer visible.

The table of FIG. 5 illustrates one example of a call group having five members. The members of the call group only report preferences for MBSFN areas for which they have received an MBSFN Area ID. The members of the group are UEs UE A, UE B, UE C, UE D and UE E. The four columns headed MBSFN Area 1 to MBSFN Area 4 in the table of FIG. 5 show what preferences each of UEs A to E have reported about the MBSFN Area.

The members UE A to UE E of the call group shown in FIG. 5 can report boost requests, for MBSFN Areas for which they have received an MBSFN Area ID. The column headed 'COVERAGE BOOST REQUEST' at the right of FIG. 5 shows whether a boost request is reported by each UE. UEs A to E may detect, for example, poor coverage. When sending a location update to infrastructure device 402, the relevant UE may then choose to include a Boost request. Infrastructure device 402 will consider these requests during call processing and E-MBMS bearer resource assignment. UE B, UE D and UE E have made boost requests.

When a UE is likely to move from one MBSFN area to another MBSFN area, it may also include an MBB service request as part of a location update, although MBB service requests are not shown on FIG. 5. Infrastructure device 402 will also consider any MBB service requests during call processing and E-MBMS bearer resource assignment.

The seventh row in the table of FIG. 5 shows the current capacity constraints known to infrastructure device 402. These capacity constraints are either that additional E-MBMS bearers are 'AVAILABLE', or that the MBSFN Area is 'FULL', and has no further E-MBMS bearers available for assignment. The capacity constraints are used by infrastructure device 402 in allocating E-MBMS bearers.

The lowest row in FIG. 5 shows an example of allocation decisions made by infrastructure device 402, in response to the other entries in the table. Two E-MBMS Bearers are used in MBSFN Area 1 when a call starts for the Group. Two group members (UE B and UE C) have reported MBSFN Area 1 as their primary MBSFN Area. In addition, UE D has been denied allocation of any E-MBMS in its primary area (MBSFN Area 3), because that area is full. Since UE D has requested a coverage boost, two E-MBMS bearers have been assigned in MBSFN Area 1, which is the only area in which UE D is known to be able to receive transmissions.

One E-MBMS Bearer is also used in MBSFN Area 2, because multiple group members (UEs A and C) have reported MBSFN Area 2 as a secondary MBSFN Area, and capacity is available. This allocation is in accordance with an exemplary policy that an MBSFN Area needs to be reported by at least two group members as at least a 'secondary' preference, in order to justify using an E-MBMS Bearer.

No E-MBMS Bearer is provided in MBSFN Area 3. This is because MBSFN Area 3 does not currently have E-MBMS resources to support an additional E-MBMS Bearer.

Two E-MBMS Bearers are used in MBSFN Area 4. UE A and UE E have requested MBSFN Area 4 as their primary preference. UE E has also requested a coverage boost. There is available capacity, so two E-MBMS bearers have been assigned within MBSFN Area 4, to provide the call to UE A and UE E. Here the term 'used' may mean the use of an existing bearer, or the allocation and starting of a new bearer.

The table in FIG. 5 may represent preferences reported prior to the start of a call. These preferences are then used by infrastructure device 402 to select MBSFN areas when a call starts. However, infrastructure device 402 may also add or remove MBSFN areas while a call is in progress. For example, a UE may detect poor reception in an MBSFN area during a call, and then request a boost. This might lead to a second E-MBMS bearer being added, during a call. This may occur as a UE is moving between two MBSFN areas, in which case the UE may also make a request for MBB service.

Many algorithms could be used for deciding when two E-MBMS bearers can be allocated to one call in one MBSFN Area, and for deciding when to include any particular MBSFN Area in a call. The threshold policies for each of these decisions may be programmable to any number of preferences or requests for coverage boosts, as is suitable for the system. Each MBSFN Area could use different policies and/or different detailed criteria. As examples, more than one E-MBMS bearer may be assigned in a particular MBSFN Area when a request for a coverage boost is received and: (i) At least one UE requests the particular MBSFN Area as its primary preferred MBSFN Area; or (ii) When at least two UEs request the particular MBSFN Area as their secondary preferred MBSFN Area. The question of whether or not a UE requests a coverage boost may also depend on factors such as the device being stationary or at an incident, incident locations, or an emergency state.

As is clear from the lowest row in the table of FIG. 5, resource availability is a factor in allocation decisions by infrastructure device 402. For example E-MBMS resources can be assigned as extra/secondary E-MBMS resources, if they are otherwise unused and are in the same MBSFN area. The infrastructure device 402 may also receive a request for a Make Before Break (MBB) service, in addition to the request for a boost to coverage. Infrastructure device 402 may then assign the first E-MBMS bearer and the second E-MBMS bearer in one MBSFN Area, also at least partly on the basis of the additional request for the MBB service.

Many other selection criteria may be used to decide whether or not to assign a second E-MBMS bearer in one MBSFN Area. The decision to include multiple E-MBMS bearers in a particular MBSFN Area can, for example, also be done independent of a request for a coverage boost. For example, an Emergency Call could be configured to always use multiple E-MBMS bearers when available in any MBSFN Area. Alternatively, or in addition, an additional E-MBMS bearer could be included in any MBSFN Area in which a UE is located that is important to the call. Alternatively, or in addition, a second E-MBMS bearer may be assigned when the bearer would otherwise remain unused.

FIG. 6 shows the same example of a call group as FIG. 5, having five members UEs UE A, UE B, UE C, UE D and UE E. The members of the call group only report preferences for MBSFN areas for which they have received an MBSFN Area ID. The rows and columns of FIG. 6 correspond to those in FIG. 5.

The entries in FIG. 6 differ from those in FIG. 5. In the column for MBSFN Area 1, UE B, UE C and UE D have reported the same preferences as in FIG. 5. However, the policy rule for MBSFN Area 1 is that a second E-MBMS bearer will only be allocated when there is either a request for an emergency call, or a UE cannot receive a bearer in another area that it has identified as its primary preference. Since neither is the case, MBSFN Area 1 only provides one E-MBMS bearer. Notably, UE E now does have an E-MBMS bearer in MBSFN Area 3, unlike in FIG. 5. This is a different outcome in FIG. 6 for MBSFN Area 1 than in FIG. 5, when the same policy rules were in place for MBSFN Area 1, because the MBSFN capacity constraints are different in the example of FIG. 6 than in FIG. 5.

FIG. 6 also differs in the assignment of E-MBMS bearers in the column for MBSFN Area 3, in comparison to the situation in FIG. 5. In FIG. 6, there are E-MBMS bearers available in MBSFN Area 3. Thus two E-MBMS bearers have been assigned to support the call in MBSFN Area 3. In FIG. 6, UE D now has good coverage in MBSFN Area 3. Therefore infrastructure device 402 recognizes that there is no pressing need for two E-MBMS bearers in MBSFN Area 1. This contrasts with the situation in FIG. 5 where UE D could not be assigned even a single bearer in MBSFN Area 3, so was provided with two bearers in its second preference area, MBSFN Area 1.

Infrastructure device 402 may receive identifiers for primary preferred MBSFN areas and secondary preferred MBSFN areas for very large numbers of UEs that are members of a call group Infrastructure device 402 then determines which E-MBMS bearers and which MBSFN areas to include in the call, on the basis of all the primary preferred MBSFN areas and secondary preferred MBSFN areas known to it for all the UEs Infrastructure device 402 will assign a different Temporary Mobile Group Identifier (TMGI) for each of two or more E-MBMS bearers assigned in any one MBSFN area. In addition, infrastructure device 402 may assign a different Temporary Mobile Group Identifier (TMGI) for the E-MBMS bearers in each of the first and second MBSFN areas. Alternatively, infrastructure device 402 may assign the same TMGI for one E-MBMS bearer in each of the first and second MBSFN areas providing a call.

Two or more Multicast Traffic Channels will be assigned, one each to support each E-MBMS bearer. However, the MTCH is an LTE RAN specific identifier. Hence the MTCH is only known to the lower layers of LTE RAN elements, i.e. the MTCH is not known by the UE, or by the infrastructure device 402 acting as an application controller. The information that infrastructure device 402 and the UE have access to are MBSFN identities and TMGI identities. The TMGI will be mapped to a MTCH by RAN elements, as known from the 3GPP standards Infrastructure device 402 notifies call group members of the E-MBMS bearers assigned to the call.

At the start of a group call, infrastructure device 402 may, for example, notify a call group member about a first and a second E-MBMS bearer assigned within one MBSFN Area. Part way through a call, a UE may already be receiving the call on a first E-MBMS bearer in the MBSFN area, and then the UE requests a coverage boost. In this case, infrastructure device 402 may only then notify the UE of the additional E-MBMS bearer. The second E-MBMS bearer is identified by a TMGI that differs from the TMGI of the first E-MBMS bearer within the MBSFN Area.

Considering UE 410 further, it is clear that UE 410 provides E-MBMS area location update information to infrastructure device 402 operably coupled to the communications system. The communications system may be a Third Generation Partnership Project (3GPP) compliant wireless communication system having a radio access network comprising one or more MBSFN areas, wherein each MBSFN area provides an E-MBMS transmission, and supports a plurality of E-MBMS bearers for transporting media streams to UEs. UE 410 is configured for multiple MBSFN reception, and uses application layer processing to perform: (i) receiving a transmission from an MBSFN area, the transmission comprising an identifier of the MBSFN area; (ii) transmitting information to an infrastructure device operably coupled to the 3GPP compliant system, the information comprising the identifier that identifies the MBSFN area and at least one of a request for a boost to the quality of the transmissions received by the UE and a request for a call to be processed as an emergency call; (iii) receiving a call using a first E-MBMS bearer and a second E-MBMS bearer in the MBSFN area, the call being provided to a call group comprising the UE, the first E-MBMS bearer providing a first media content stream to the UE and the second E-MBMS bearer providing a second media content stream to the UE, wherein the first media content stream and the second media content stream comprise the same call information. UE 410 may receive the first and second media content streams on different Temporary Mobile Group Identifiers (TMGI), used for the first E-MBMS bearer and the second E-MBMS bearer within the MBSFN Area.

UE 410 may determine whether a level of a received signal from each of at least two MBSFN areas exceeds a first threshold and a second threshold, the second threshold being greater than the first threshold. The UE 410 may then only consider a received signal if it exceeds the first threshold. When none of the received signal exceeds the second threshold, UE 410 may choose a primary preferred MBSFN area, a secondary preferred MBSFN area and possibly a ternary preferred MBSFN area, and notify infrastructure device 402 about the primary preferred MBSFN area, secondary preferred MBSFN area and ternary preferred MBSFN area. However, if one of the received signals does exceed the second threshold, then UE 410 may report only the MBSFN Area exceeding this threshold, as was the case for UE 218 in FIG. 3.

UE 410 may report to an application server of the 3GPP compliant system when UE 410 no longer needs to receive more than one media stream, i.e. UE 410 no longer needs to receive the same media stream over multiple E-MBMS bearers in one MBSFN Area. Alternatively, infrastructure device 402 may decide that it has too few bearers to meet demand for multiple calls, and at that point discontinue the second E-MBMS bearer supporting the call to UE 410. Either action will serve to further free up E-MBMS resources.

Figure 7:
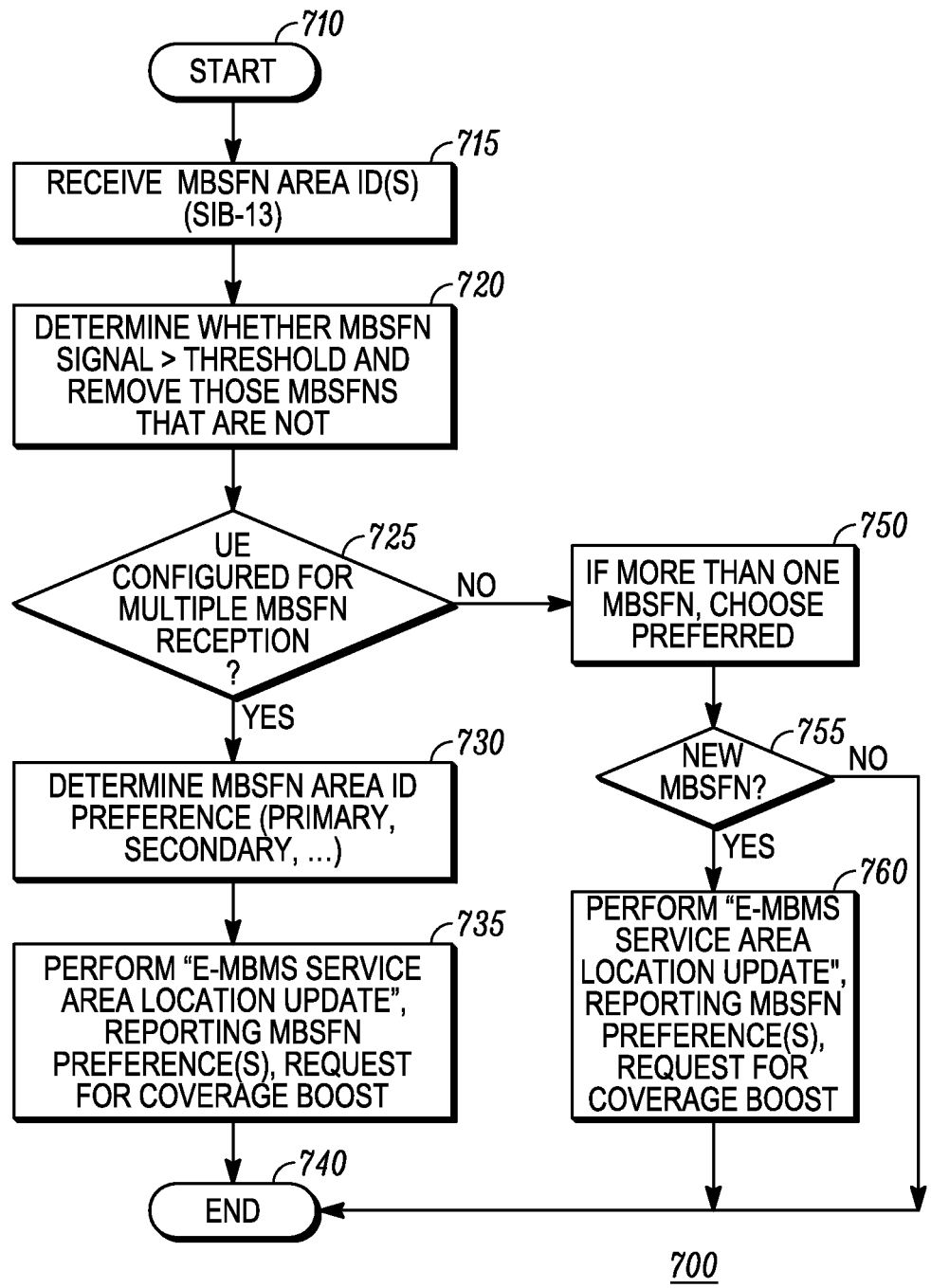
FIG. 7 is a flowchart of a method of providing a service area location update, by a UE, in accordance with some embodiments.

FIG. 7 is a flowchart of a method 700 of providing an MBSFN area location update, by UE 410, in accordance with some embodiments.

Following start 710, UE 410 receives MBSFN area IDs at 715. At 720, UE 410 determines whether the quality of reception from each MBSFN area is above a first threshold. Those that are not are discarded. At 725, a decision is made whether or not the UE is in fact configured to receive traffic signals from more than one MBSFN area. If yes, then the method proceeds to 730. At 730, the UE 410 decides on relative preferences of the two or more received MBSFN area IDs. At 735, UE 410 reports the preferences as an 'E-MBMS service area location update'. At 735, UE 410 also reports any boost request, and/or MBB service request. A boost request or MBB service request an 'E-MBMS service area location update may act as a 'flag', to notify the purpose of the UE 410 reporting multiple MBSFN areas, if the purpose is known by the UE. For example a stationary device on the fringe of coverage may report multiple MBSFN areas for improved reception quality, as opposed to MBSFN mobility. This flag may be used, for example, to request that multiple MBSFN areas be labeled as 'preferred' in the list held by infrastructure device 402, or that multiple E-MBMS bearers be provided in a single MBSFN Area. Then the method ends at 740.

If UE 410 is not configured to receive traffic signals from more than one MBSFN area, then at 725 the method proceeds to 750. If the quality of reception from more than one MBSFN area is above the first threshold, then UE 410 chooses the most preferred MBSFN area, at 750. At 755, a decision is made whether the chosen most preferred MBSFN area is new. If it is, then UE 410 reports the most preferred MBSFN area as an 'E-MBMS service area location update' at 760. At 760, UE 410 also reports any boost request, for two or more E-MBMS bearers within the preferred MBSFN area. Then the method ends at 740. At 755, if the chosen most preferred MBSFN is not new, then the method ends at 740.

Figure 8:
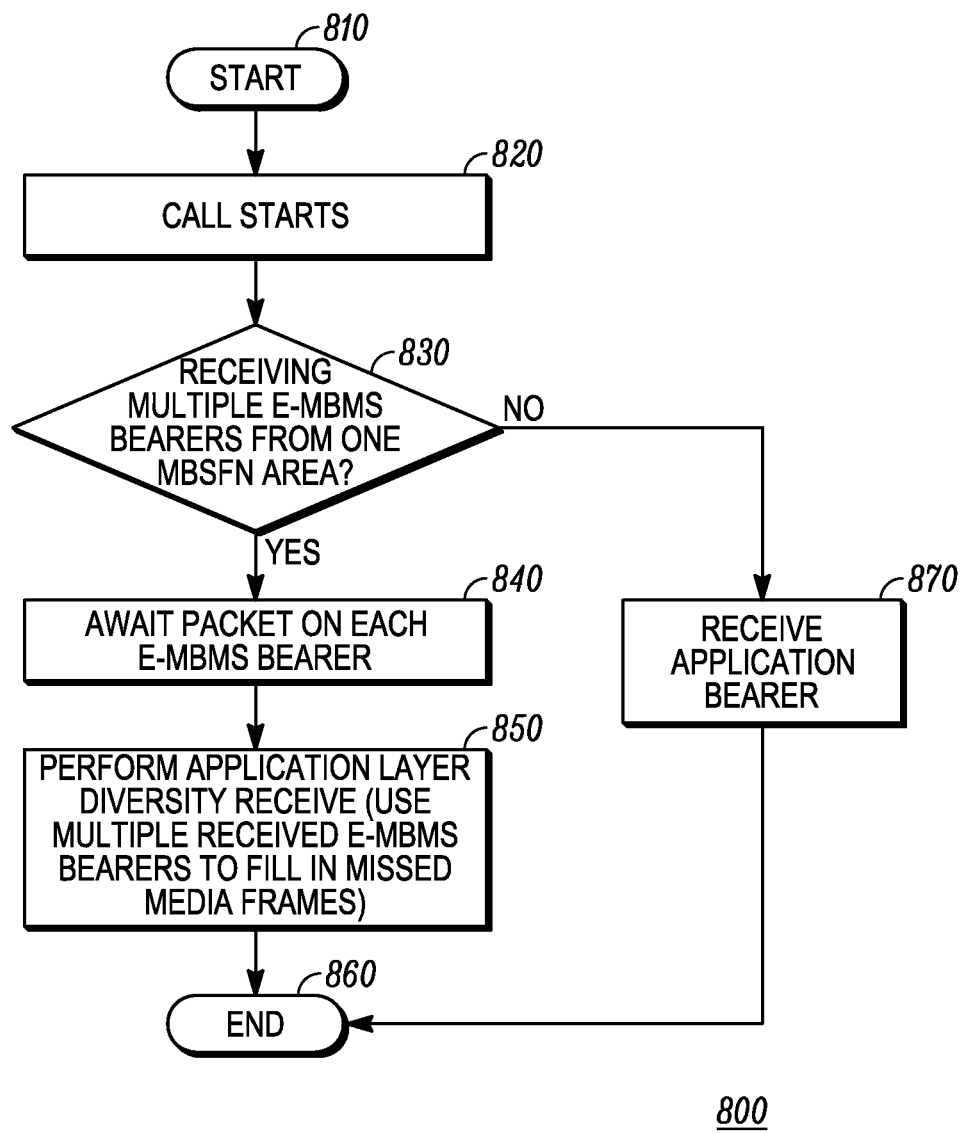
FIG. 8 is a flowchart of a method of receiving multiple E-MBMS bearers, by a UE, in accordance with some embodiments.

FIG. 8 is a flowchart of a method 800 of receiving multiple E-MBMS bearers, by a UE, in accordance with some embodiments.

Following the start at 810, a call begins at 820. If, at 830, UE 410 is receiving the same media content on more than one E-MBMS bearer in one MBSFN Area, then the method proceeds to 840, and waits for a packet to be received separately off all the E-MBMS bearers, i.e. for the same packet to be received multiple times, once form each bearer. Thus, at 840, UE 410 collects multiple copies of a given packet, and then can align the different copies of the packet from each bearer. At 850, UE 410 performs application layer diversity reception, by filling in missed media frames using the multiple received copies, i.e. one from each E-MBMS bearer, if the packet is successfully received on each bearer. The method ends at 860.

If, at 830, UE 410 is receiving only one E-MBMS bearer, then the method proceeds to 870. UE 410 receives on only one E-MBMS bearer, until the method ends at 860.

The adjustment of the jitter buffer to accommodate the reception of diverse E-MBMS bearer timing differences may be achieved by reading those differences from Real-time Transport Protocol (RTP) header information of the received media packets. If an RTP frame of the media content stream is missing from one E-MBMS bearer, but was received on another E-MBMS bearer within the jitter buffer time, then UE 410 will use the RTP frame received on the other E-MBMS bearer to reconstruct the received media stream. When the same packet is received multiple times, UE 410 will discard all but one. When a packet is missed in one media stream, UE 410 will use the corresponding packet from the other stream. UE 410 may rely on RTP or other header information, at any time, to construct a single media stream from different received streams.

The method of FIG. 8 may also describe the behavior of a UE 410 when the same media content stream is received from two E-MBMS bearers within one MBSFN Area, and also from another E-MBMS bearer in a different MBSFN Area. All three of these E-MBMS bearers will have different TMGIs.

Figure 9:
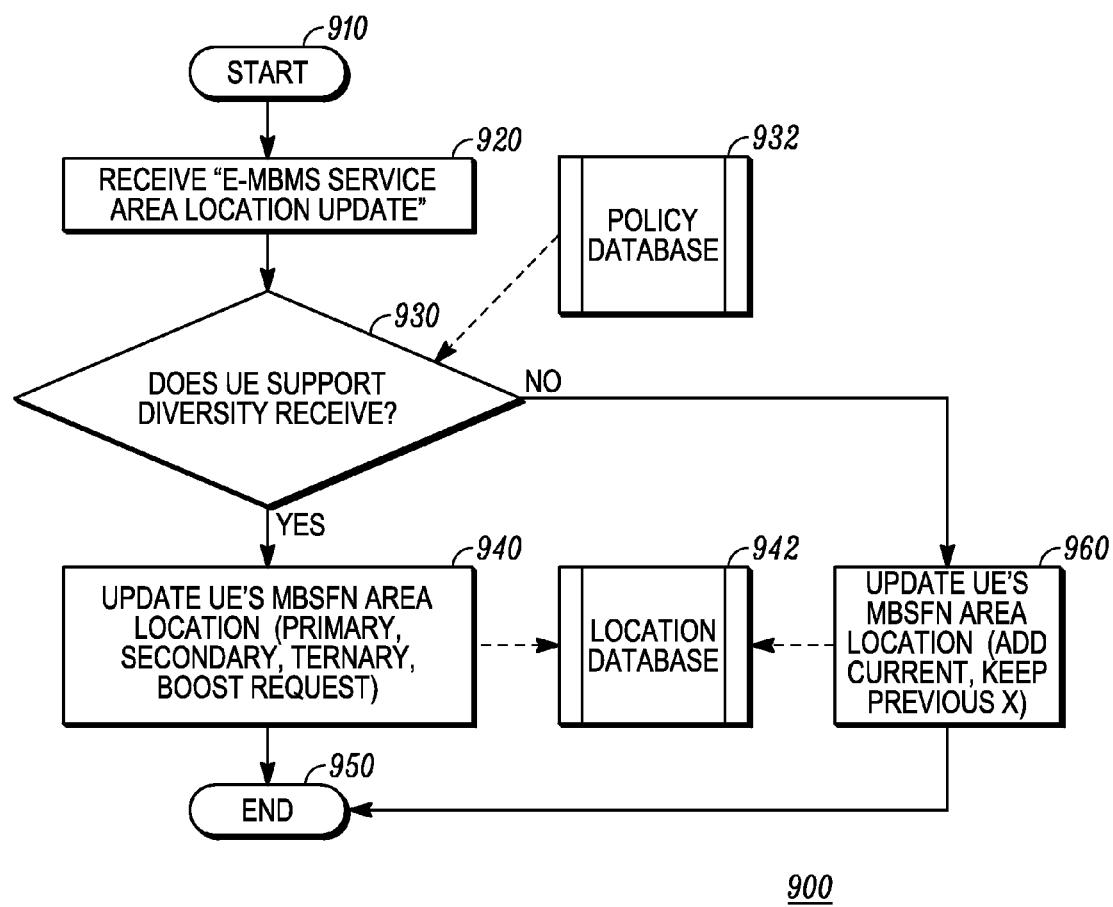
FIG. 9 is a flowchart of a method of receiving a service area location update, by an infrastructure device, in accordance with some embodiments.

FIG. 9 is a flowchart of a method 900 of receiving an E-MBMS MBSFN area location update, by an infrastructure device, in accordance with some embodiments.

Following the start at 910, at 920 the infrastructure device 402 receives an 'E-MBMS service area location update', which may be generated as illustrated in FIG. 7. At 930, policy database 932 is checked to see whether UE 410 reporting the 'E-MBMS service area location update' is allowed to receive media content on more than one E-MBMS bearer. If the UE is allowed to receive media content from more than one E-MBMS bearer, then at 940 the UE's reported MBSFN area preferences and entries for any request for a coverage boost or MBB service request are updated. A location database 942 may also be updated. Location database 942 may store 'Reported Location' and 'Requests for a coverage boost' of many UEs, and each of these may be updated. At 950, the method ends.

If, at 930, the UE is not allowed to receive media content on more than one E-MBMS bearer, then method 900 proceeds to 960. At 960, the UE's reported primary MBSFN area location is updated, and this update may be provided to location database 942. At 950, the method ends.

Figure 10:
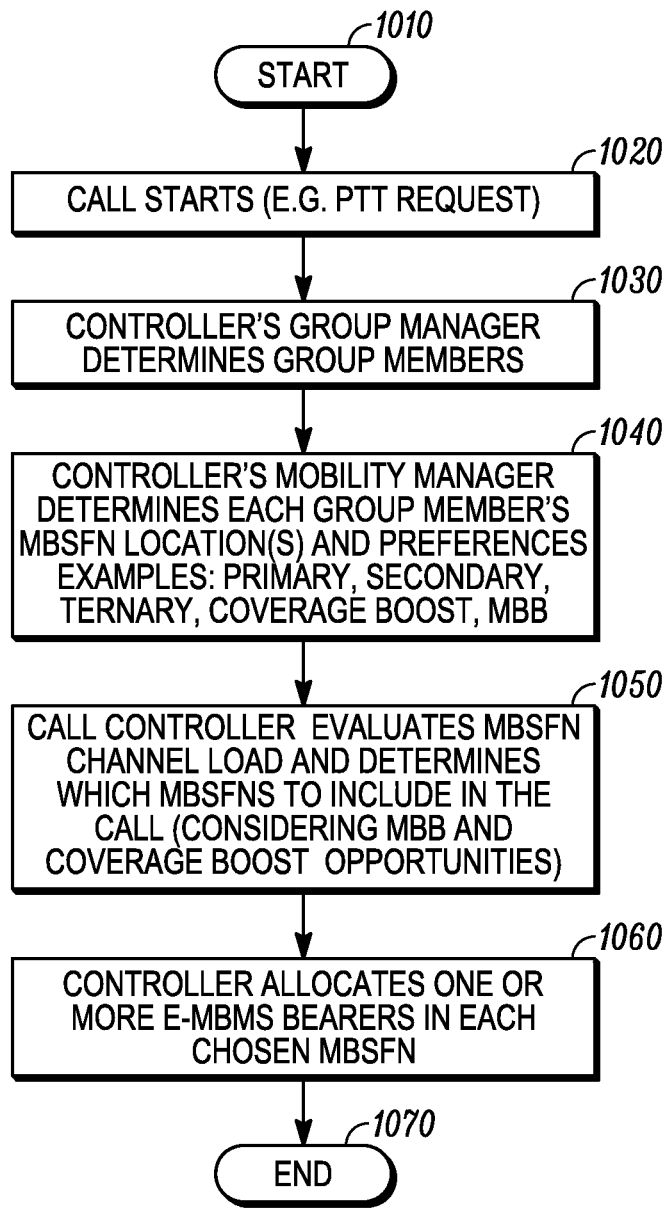
FIG. 10 is a flowchart of a method of assigning MBSFN areas, and E-MBMS bearers within MBSFN Areas by an infrastructure device, in accordance with some embodiments.

FIG. 10 is a flowchart of a method 1000 of assigning MBSFN areas and E-MBMS bearers by an infrastructure device, in accordance with some embodiments.

Following start 1010, a call begins at 1020. This may be due to a Push-To-Talk (PTT) request. Group membership is determined at 1030. At 1040, the location in an MBSFN area, the preferences and any requests for coverage boost or MBB service requests are determined for each group member, i.e. for each UE in that call group. At 1050, a decision is made about the MBSFN areas to include in the call. If a first UE in a particular MBSFN area is already receiving the media content, then a second UE in that MBSFN area 410 will receive the content on the same E-MBMS bearer as the first UE, so a new E-MBMS bearer is not assigned for the second UE.

At 1060, E-MBMS resources are allocated to the chosen MBSFN areas. As illustrated in FIGS. 5 and 6, two or more E-MBMS bearers may be allocated within one MBSFN Area. Infrastructure device 402 may be configured to perform any of the roles identified at 1030, 1040, 1050 or 1060. At 1070, the method ends.

Considering FIGS. 9 and 10 together, it is apparent that several actions differ entirely from known methods. Firstly, policy is introduced to determine whether a given UE is allowed to receive the same information in different media content streams, on two or more E-MBMS bearers in one MBSFN Area. An MBSFN area assigned as shown in FIG. 10 may then provide the same information in different media content streams, on two or more E-MBMS bearers in one MBSFN Area. Those bearers will have different TMGIs, within one MBSFN Area.

Figure 11:
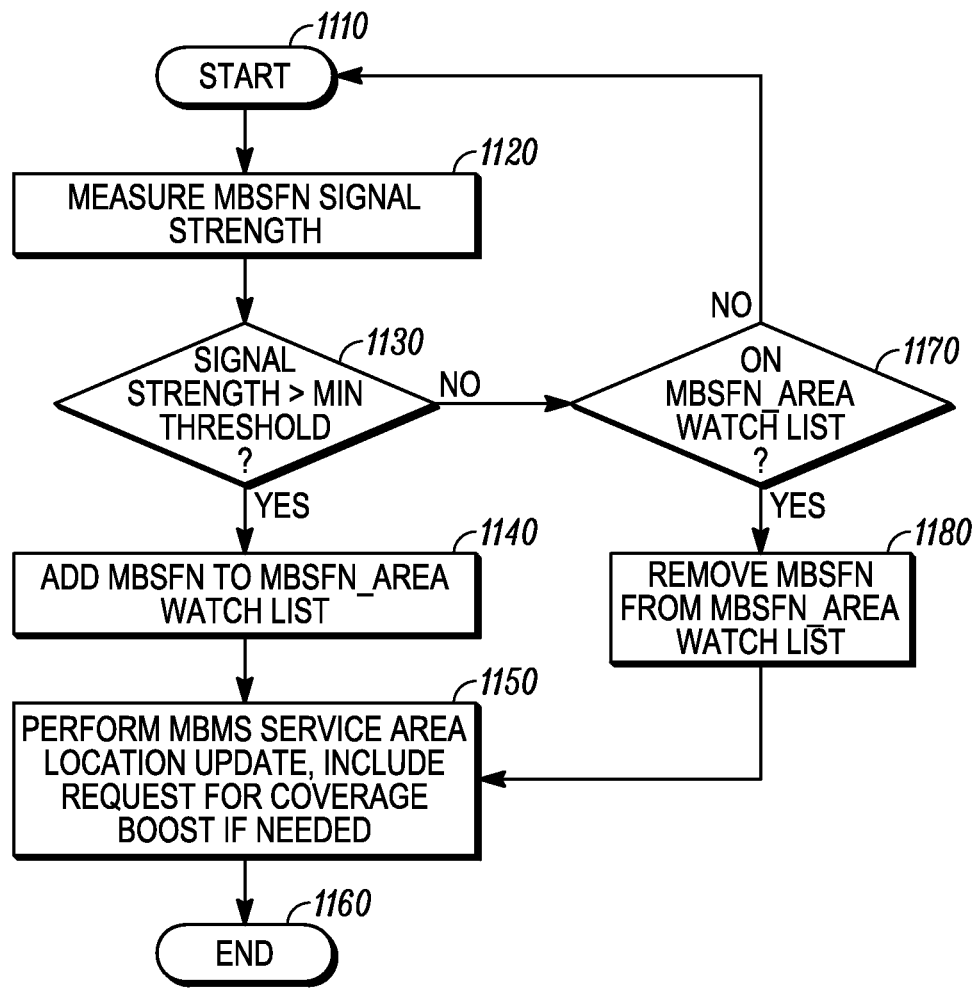
FIG. 11 is a flowchart of a method of deciding on MBSFN areas for inclusion in a service area location update, by a UE, in accordance with some embodiments.

FIG. 11 is a flowchart of a method of deciding on MBSFN areas for inclusion in an E-MBMS MBSFN location update, by a UE, in accordance with some embodiments.

Following start 1110, UE 410 measures the received MBSFN signal strength at 1120. For example, UE 410 may measure the media frame reception quality, MCCH signal metrics or MTCH signal metrics. If, at 1130, the signal strength exceeds a first threshold, the method proceeds to 1140. At 1140, the MBSFN area is added to an MBSFN area watch list of UE 410. At 1150, UE 410 performs an E-MBMS Location update, which may include a request for a coverage boost. The method ends at 1160.

If, at 1130, the signal strength does not exceed a first threshold, the method proceeds to 1170. If, at 1170, the MBSFN area is already on the MBSFN area watch list of UE 410, the MBSFN area will be removed from the watch list at 1180. Then the method proceeds to 1150, where UE 410 performs an E-MBMS Service Area Location update. If, at 1170, the MBSFN area is not on the MBSFN area watch list of UE 410, the method returns to the start at 1110.

UE 410 may determine whether a level of a received signal from each of the received MBSFN areas, for example at least three MBSFNs, exceeds a first threshold and a second threshold. In this case, the second threshold is greater than the first threshold. UE 410 may then only consider a received signal if it exceeds the first threshold. When none of the at least three signals exceeds the second threshold, UE 410 may choose a primary preferred MBSFN area, a secondary preferred MBSFN area and a ternary preferred MBSFN area. However, when at least one of the at least three signals exceeds the higher second threshold, UE 410 may choose the highest of the signals as a default MBSFN area and then just notify the infrastructure device 402 about the default MBSFN area.

These threshold values can also be used to determine whether a UE will request a 'boost' in each MBSFN Area. For example, if MBSFN Area 1 exceeds all thresholds, then it doesn't need a boost. However, in this example, when the best signal reception in MBSFN Area 2 just crosses a low threshold, the UE may then report a need for a boost in MBSFN Area 2. When the server is deciding to pick MBSFN areas to support the UE in a call, it could either pick MBSFN Area 1 with one bearer, or pick MBSFN Area 2 with two bearers. If no bearers are available in MBSFN Area 1, then the UE would be supported by two bearers in MBSFN Area 2.

Figure 12:
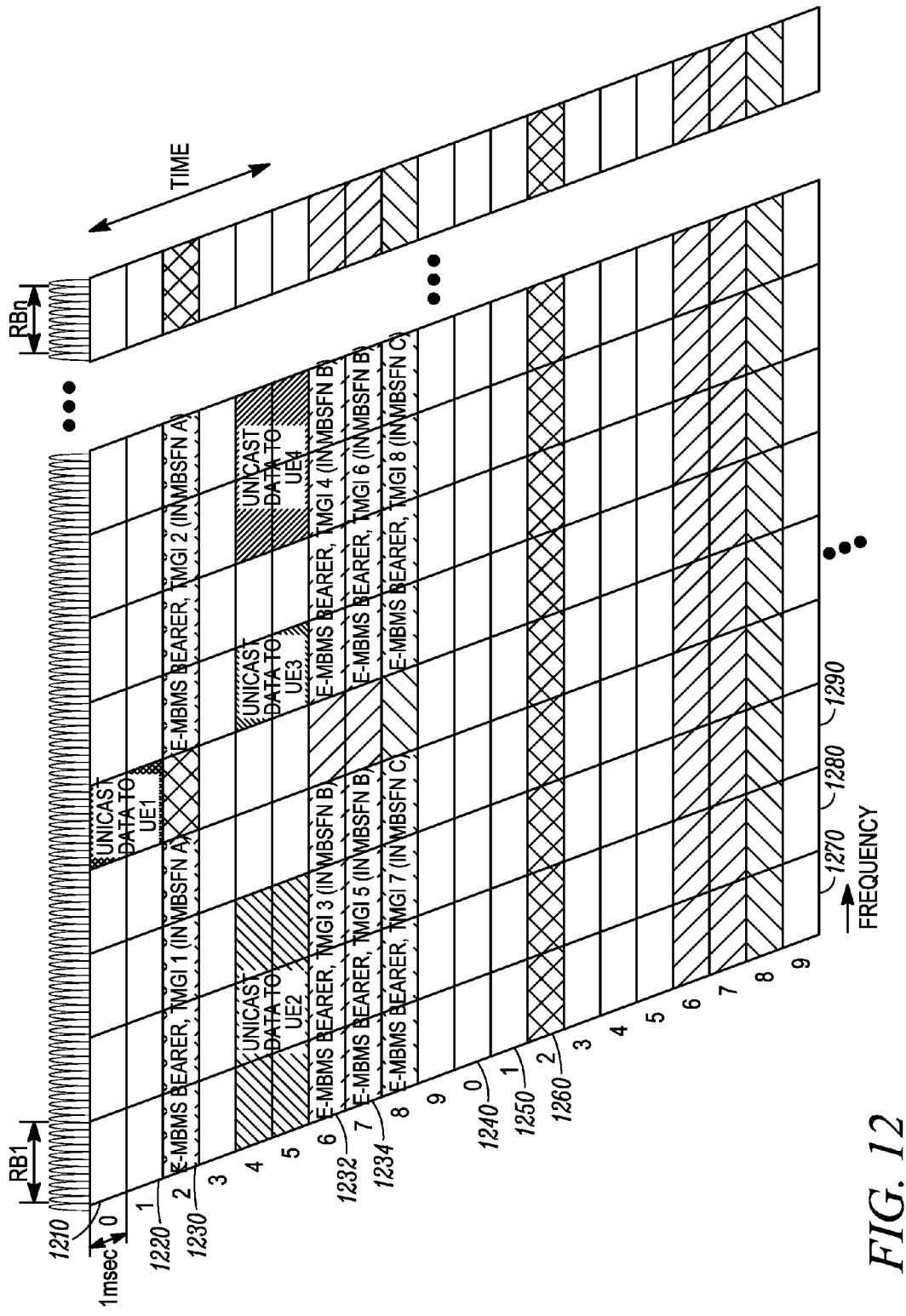
FIG. 12 is a schematic view of signals that may be transmitted in a communication system, in accordance with some embodiments.

FIG. 12 is a schematic view of signals that may be transmitted in a communication system, in accordance with some embodiments.

Each of rows 1210, 1220 and 1230 shows a 1 msec subframe. The first ten subframes shown on FIG. 12 are numbered 0-9, and these form a first radio frame. Each of rows 1240, 1250 and 1260 shows one of the first three a 1 msec subframes of a second radio frame, the ten subframes of which are also numbered from 0-9. The second radio frame is transmitted after the first radio frame.

In the embodiment of FIG. 12, the subframes numbered 0, 4, 5 and 9 of each frame are not available for E-MBMS transmissions. At least subframes 0, 4, 5 and 9 in each frame can be used for unicast transmissions to UEs, and may be reserved for this purpose. Unicast may be used to transmit to a UE that does not meet the requirements for assignment of a multicast service, for example because it is the only member of a call group currently identifying a particular MBSFN area as a preferred MBSFN area. However, unicast traffic can be assigned to any parts of a subframe not allocated to E-MBMS.

Columns 1270, 1280 and 1290 represent the first three resource blocks of each subframe. These blocks may be 180 KHz blocks, each comprising 12 subcarriers. Considering for example LTE, LTE can be deployed in multiple bandwidths. The bandwidth depends on the spectrum allocated by local governments, e.g. 1.25 MHz, 5 MHz, and 10 MHz. In the US, Public safety has been given 10 MHz uplink and downlink for a total of 20 MHz. FIG. 12 shows resource blocks running from RB1 to RBn. Using the scheme of FIG. 12 where 1 Resource Block=180 KHz and has 12 Subcarriers, would mean that 5 Mhz of bandwidth has 25 Resource blocks, and 10 MHz would have 50 Resource Blocks (RB). In the embodiment of FIG. 12, a TMGI or MCCH can also wrap between two subframes within a single MBSFN, to be complete.

In FIG. 12, time diversity is guaranteed when media content is delivered on E-MBMS bearers sent on differing subframes. For example, when subframe 6 with reference 1232 and subframe 7 with reference 1234 are used, the TMGI 3 and TMGI 5 are offset in time but are on the same frequency (resource blocks).

A frequency diversity is guaranteed when media content is delivered on E-MBMS bearers sent on the same subframe but in different resource blocks. For example, when subframe 6 with reference 1232 is used to deliver the media content, then TMGI 3 and TMGI 4 are offset in frequency (resource blocks).

Both time and frequency diversity are guaranteed when media content is delivered on E-MBMS bearers in differing subframes and resource blocks. For example, when subframe 6 with reference 1232 and subframe 7 with reference 1234 are used, the TMGI 3 and TMGI 6 are offset from each other in both time and frequency.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of assigning Multimedia Broadcast Multicast Service (E-MBMS) bearers in a Multimedia Broadcast Single Frequency Network (MBSFN) area in a Third Generation Partnership Project (3GPP) compliant wireless communication system, the method comprising:
   an infrastructure device operably coupled to the 3GPP compliant system, the 3GPP compliant system having a radio access network comprising one or more MBSFN areas, wherein each MBSFN area supports a plurality of E-MBMS bearers for transporting media streams to user equipments (UE), the infrastructure device using application layer processing to perform:
   receiving information from a UE, the information comprising:
      an identifier that identifies at least a primary preferred MBSFN area for providing transmissions to the UE;
      a request for a boost to the quality of the transmissions received by the UE;
   using a first E-MBMS bearer and a second E-MBMS bearer in an MBSFN area, to support a call to the UE, the first E-MBMS bearer providing a first media content stream to the UE and the second E-MBMS bearer providing a second media content stream to the UE, the first media content stream and the second media content stream comprising the same information.

2. The method of claim 1, wherein the infrastructure device:
   receives, in a first message from the UE, the identifier that identifies at least a primary preferred MBSFN area;
   assigns the first E-MBMS bearer in the primary preferred MBSFN area, based on the identifier;
   receives, in a separate, second message from the UE, the request for a boost to the quality of the transmissions received by the UE, the infrastructure device receiving the second message from the UE after receiving the identifier;
   assigns the second E-MBMS bearer in the primary preferred MBSFN area in response to receiving the request for a boost to the quality of the transmissions received by the UE.

3. The method of claim 1, further comprising the infrastructure device:
   assigning a different Temporary Mobile Group Identifier (TMGI) for each of the first E-MBMS bearer and the second E-MBMS bearer in the MBSFN area.

4. The method of claim 1, further comprising:
   the infrastructure device transmitting the first media content stream on the first E-MBMS bearer and the second media content stream on the second E-MBMS bearer with a time offset, whereby the UE can employ application layer time-diversity reception to recover the information.

5. The method of claim 1, further comprising:
   the infrastructure device transmitting the first media content stream on the first E-MBMS bearer and the second media content stream on the second E-MBMS bearer with a frequency offset between a transmission frequency of the first media content stream on the first E-MBMS bearer, and a transmission frequency of the second media content stream on the second E-MBMS bearer.

6. The method of claim 1, further comprising:
   the infrastructure device assigning the MBSFN Area, and the first E-MBMS bearer and the second E-MBMS bearer within the MBSFN Area, also based on a current loading of MBSFN areas of the wireless communication system.

7. The method of claim 1, further comprising:
   the infrastructure device notifying at least the second E-MBMS bearer to the UE.

8. The method of claim 1, further comprising:
   the infrastructure device allocating a third E-MBMS bearer in the MBSFN area to provide the information to the UE in a third media content stream.

9. The method of claim 8, further comprising:
   the first, second and third E-MBMS bearers providing the same media content to the UE, offset in time and/or frequency,
   whereby the UE can employ application layer time-diversity and/or frequency-diversity reception to the received media content from the first, second and third E-MBMS bearers.

10. The method of claim 1, further comprising the infrastructure device:
   receiving an indication of a priority level of a call; and
   assigning the first E-MBMS bearer and the second E-MBMS bearer, also based on the priority level of the call.

11. The method of claim 10, further comprising the infrastructure device:
   when the priority level of the call indicates that the call is an emergency call, allocating the second E-MBMS bearer in the MBSFN area.

12. The method of claim 11, further comprising the infrastructure device:
   when the priority level of the call indicates that the call is an emergency call, also allocating a third E-MBMS bearer in the MBSFN area.

13. The method of claim 1, wherein the infrastructure device:
   also receives a request for Make Before Break (MBB) service from the UE; and
   assigns the second E-MBMS bearer responsive to both the request for a boost to the quality of the transmissions received by the UE and the request for Make Before Break (MBB) service.

14. A method for a User Equipment (UE) to receive an E-MBMS service in a Third Generation Partnership Project (3GPP) compliant wireless communication system, the 3GPP compliant system having a radio access network comprising one or more MBSFN areas, wherein each MBSFN area supports a plurality of E-MBMS bearers for transporting media streams to user equipments (UE), the method comprising a UE performing:
   receiving at least two media content streams comprising the same information in an MBSFN area, a first media content stream being received on a first E-MBMS bearer and a second media content stream being received on a second E-MBMS bearer;

time aligning the at least two media content streams;

using header information to detect missing packets from each of the at least two media content streams;

combining packets from each of the at least two media content streams, to construct a single media content stream with the information.

15. The method of claim 14, further comprising:

when the UE no longer needs to receive more than one media content stream, the UE reporting that the UE no longer needs to receive more than one media content stream, to an infrastructure device acting as an application server of the 3GPP compliant system.

16. A method for a User Equipment (UE) to provide Multimedia Broadcast/Multicast Service (E-MBMS) service area location update information to an infrastructure device in a Third Generation Partnership Project (3GPP) compliant wireless communication system, the 3GPP compliant system having a radio access network comprising one or more MBSFN areas, wherein each MBSFN area provides an E-MBMS transmission and supports a plurality of E-MBMS bearers for transporting media streams to user equipments (UE), the method comprising a UE configured for multiple MBSFN reception using application layer processing to perform:

receiving a transmission from an MBSFN area, the transmission comprising an identifier of the MBSFN area;

transmitting information to an infrastructure device operably coupled to the 3GPP compliant system, the information comprising:

the identifier that identifies the MBSFN area; and at least one of:

a request for a boost to the quality of the transmissions received by the UE;

a request for a call to be processed as an emergency call;

receiving a call on a first E-MBMS bearer and a second E-MBMS bearer in the MBSFN area, the call being provided to a call group comprising the UE, the first E-MBMS bearer providing a first media content stream to the UE and the second E-MBMS bearer providing a second media content stream to the UE, wherein the first media content stream and the second media content stream comprise the same call information.

17. The method of claim 16, further comprising:

at the UE:

receiving an MBSFN Area Identification (MBSFN Area ID) for the MBSFN area; and transmitting the MBSFN Area ID as the identifier of a primary preferred or a secondary preferred MBSFN area.

18. The method of claim 16, further comprising the UE receiving the first and second media content streams using different Temporary Mobile Group Identifiers (TMGI) on the first E-MBMS bearer and the second E-MBMS bearer.

19. The method of claim 16, further comprising:

the UE receiving the first media content stream and the second media content stream with a time offset between reception of the first media content stream and reception of the second media content stream, whereby the UE can employ application layer time-diversity reception to the received media content streams to retrieve the call information.

20. The method of claim 19, further comprising:

the UE receiving the first media content stream and the second media content stream with an additional frequency offset between a transmission frequency of the first media content stream on the first E-MBMS bearer, and a transmission frequency of the second media content stream on the second E-MBMS bearer.

* * * * *

UNITED STATES PATENT AND TRADEMARK OFFICE
CERTIFICATE OF CORRECTION

PATENT NO. : 8,867,425 B2  
APPLICATION NO. : 13/724098  
DATED : October 21, 2014  
INVENTOR(S) : Michael F. Korus et al.

Page 1 of 1

It is certified that error appears in the above-identified patent and that said Letters Patent is hereby corrected as shown below:

IN THE TITLE PAGE:

In Item (56), under "OTHER PUBLICATIONS," in Column 2, Line 51, delete "Netowrks,"" and insert -- Networks," --, therefor.

In Item (56), under "OTHER PUBLICATIONS," in Column 2, Line 62, delete "Reasearch" and insert -- Research --, therefor.

IN THE SPECIFICATION:

In Column 1, Line 19, delete "Drort," and insert -- Drozt, --, therefor.

In Column 8, Line 14, delete "interact Infrastructure" and insert -- interact. Infrastructure --, therefor.

In Column 8, Line 28, delete "Radio Link 434" and insert -- Radio Link 420 --, therefor.

In Column 9, Line 57, delete "UEs Infrastructure" and insert -- UEs. Infrastructure --, therefor.

In Column 10, Line 9, delete "parameters Infrastructure" and insert -- parameters. Infrastructure --, therefor.

In Column 13, Line 12, delete "group Infrastructure" and insert -- group. Infrastructure --, therefor.

In Column 13, Line 16, delete "UEs Infrastructure" and insert -- UEs. Infrastructure --, therefor.

In Column 13, Line 34, delete "standards Infrastructure" and insert -- standards. Infrastructure --, therefor.

In Column 17, Line 33, delete "Mhz" and insert -- MHz --, therefor.

Signed and Sealed this  
Third Day of May, 2016

Michelle K. Lee  
*Director of the United States Patent and Trademark Office*